United States Patent [19]

Choate

[11] Patent Number: 4,728,958
[45] Date of Patent: Mar. 1, 1988

[54] COHERENT ELECTROMAGNETIC ENERGY EMITTER LOCATOR

[75] Inventor: William C. Choate, Dallas, Tex.
[73] Assignee: Texas Instruments Incorporated, Dallas, Tex.
[21] Appl. No.: 833,937
[22] Filed: Feb. 25, 1986
[51] Int. Cl.⁴ ............................................... G01S 5/02
[52] U.S. Cl. ...................................... 342/424; 342/156
[58] Field of Search ................... 342/424, 56, 147, 156

[56] References Cited

U.S. PATENT DOCUMENTS

| | | | |
|---|---|---|---|
| 3,787,863 | 1/1974 | Watanabe et al. | 342/424 |
| 3,795,000 | 2/1974 | Bell, Jr. et al. | 342/424 |
| 4,136,342 | 1/1979 | Alcock et al. | 342/424 |
| 4,160,252 | 7/1979 | Lucas et al. | 342/424 |
| 4,466,067 | 8/1984 | Fontana | 342/424 X |
| 4,532,515 | 7/1985 | Cantrell et al. | 342/424 X |

*Primary Examiner*—Theodore M. Blum
*Assistant Examiner*—John B. Sotomayor
*Attorney, Agent, or Firm*—Richard K. Robinson; James T. Comfort; Melvin Sharp

[57] ABSTRACT

An emitter location system includes a single carrier based first and second short baseline interferometers, and a long baseline interferometer operatively connected to a computing means. The computing means includes a three level processor. The short baseline interferometers provide phase measurements for level one combination into total phase measurements and estimates of the angle of incidence of the incoming electromagnetic energy. After test for acceptance, the estimated angle of incidence is passed for level two processing which includes the simultaneous processing of the estimated incident angle with the phase measurement of the long baseline interferometer for error correction to provide an improved estimated incident angle. After test for acceptance, the improved angle of incidence measurement is passed for determining the angle of the incident wave for level three processing. Level three processing utilizes the bearing estimates and the carrier position and heading information for an inertial navigation system to relate the information to a fixed coordinate system. Then the location of the emitter is determined using least square method.

6 Claims, 20 Drawing Figures

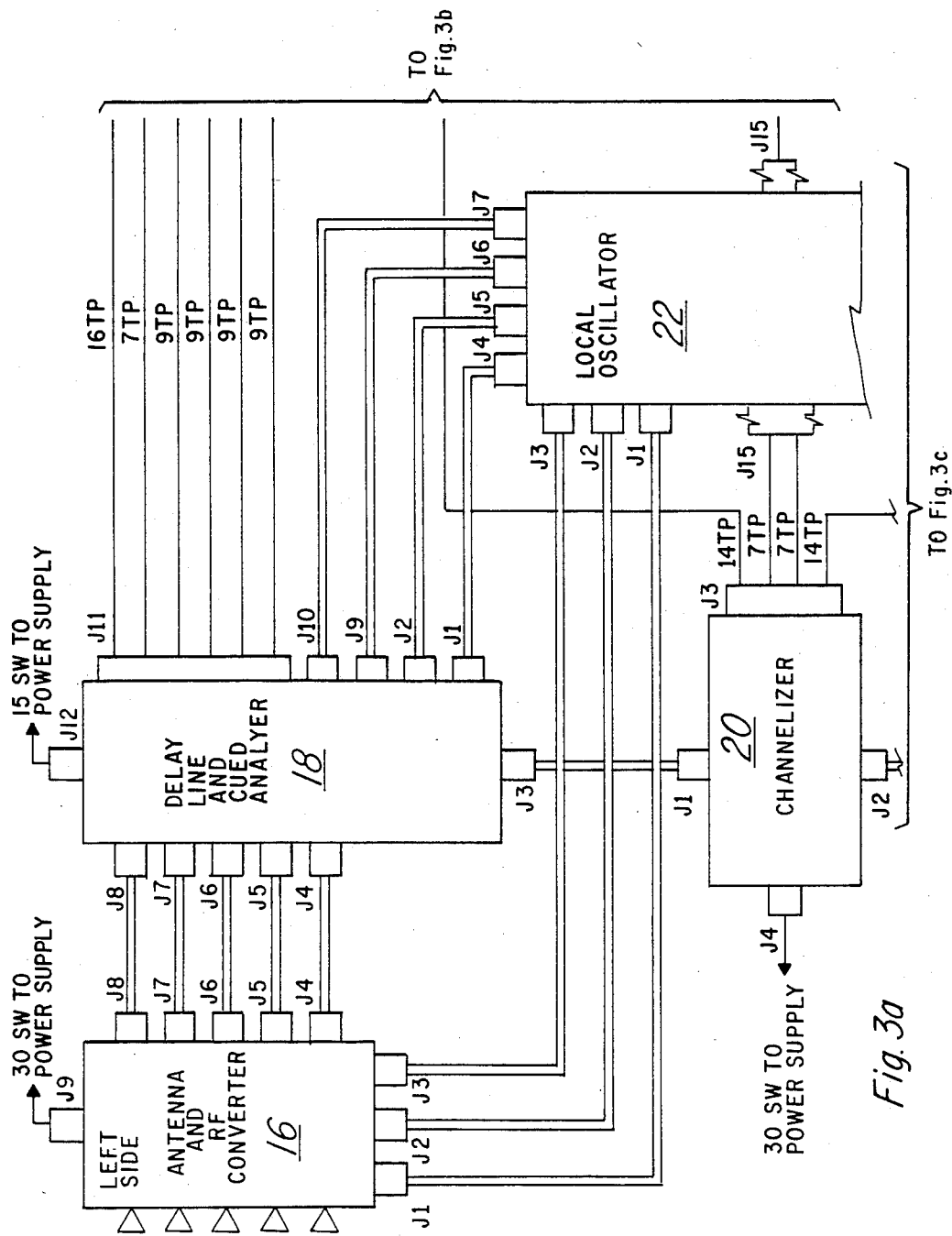

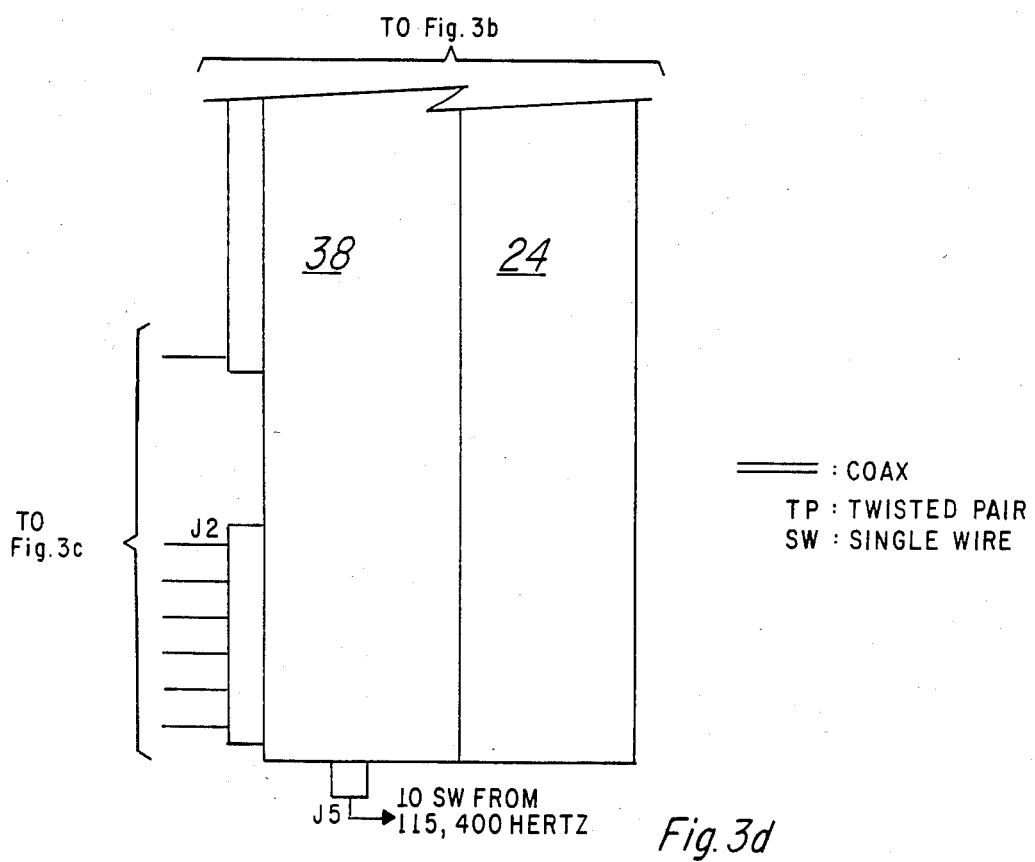

COHERENT ELECTROMAGNETIC ENERGY EMITTER LOCATOR

BACKGROUND OF THE INVENTION

This invention relates to electronic reconnaissance devices and more particularly to an improved coherent electromagnetic energy emitter location device for detecting and locating radars and other electromagnetic emitters such as those in communication networks.

The problem of locating an object on the surface of the earth by the use of indirect measurements has a long history. Surveyors and navigators, for example, have always been concerned with location estimation.

To locate an object on the surface of the earth in a three dimensional coordinate system requires measurements on at least three independent quantities functionally related to the three coordinate values of the object. For locating electromagnetic emitters passively, the measurements generally taken are emitter altitude (from local topographic data) and either of the following: (1) direction of arrival of the electromagnetic waves at two or more locations of a single aircraft, or (2) time of arrival of emitter pulses at three aircraft locations. These measurements are then combined with the known (or estimated) locations from which they were taken, the functional relations among the various locations and measured quantities, and assumptions about the error distributions of the measurements, to arrive at an emitter location estimate.

Known systems include a single aircraft direction finding (DF) system which makes direction of arrival (directional bearing) measurements on emitter pulses from two or more locations along the aircrafts's flight path. If desired, the bearing measurement data may be combined with those of a second DF aircraft via a data link in order to obtain near instantaneous location estimates. The aircraft location and the bearing measurement base line are provided by a Loran-inertial navigation system or the like. In another system, time of arrival measurements are made on emitter pulses from three aircraft. The aircraft locations are determined from measurements of the ranges between aircraft and to two ground stations by distance measuring equipment systems, and aircraft altitudes from altimeters.

In the scenario in which there are exactly as many functionally independent quantities measured as there are coordinates to estimate, the location estimation problem is simply one of determining the solution of the functional equations. But, when there are more measurements than quantities to estimate, the question arises as to the proper method of combining the various measurements to obtain the most accurate location estimate as well as the probability distributions of the measurement errors and the relations among the measured quantities. Solutions for this problem depend upon the choice of criteria for the average closeness of an estimate as well as the probability distributions of the measurement errors and the relations among the measured quantities.

One standard measure of the closeness of a location estimation procedure is the location CEP (circular error probable), the circle around the true location within which 50% of such estimates would lie. When the emitter coordinate estimates have a multivariate normal distribution with mean values equal to the true coordinates, the location CEP can be expressed as a function of the variances and covariances of the location coordinate estimates. The lower bound is derived by use of the Cramer-Rao inequality under the assumption that the measurements have a multivariate normal distribution with mean values equal to the quantities measured. The covariance matrix for generalized least squares location estimates approximates that given by the lower bound. The emitter location CEPs are obtained for DF systems and time of arrival. A discussion of the above prior art is set forth in detail in DTIC Technical Report. ON THE ACCURACY ANALYSIS OF AIRBORNE TECHNIQUES FOR PASSIVELY LOCATING ELECTROMAGNETIC EMITTERS, by L. H. Wegner, R-722-PR, June 1971.

The disadvantage attending single-aircraft DF system, where direction of arrival information is obtained along the aircraft's flight path, is that the emitter to be located may cease transmitting. Thus, the solution to this problem has been to use two aircraft for the DF system and three aircraft for the time of arrival system.

SUMMARY OF THE INVENTION

It is an object of this invention to provide an improved emitter locator system.

Another object of the invention is to provide an emitter locator system suitable for use on a single carrier.

Yet another object of the invention is to provide a cost effective system with field-of-view coverage in the forward hemisphere of the aircraft.

Still another object of the invention is to provide an emitter locator system having minimal aerodynamic and structural impact.

A further object of the invention is to provide an emitter locator system having time apertures of fractional seconds.

Briefly stated the invention consists of an improved emitter locator system (ELS) for use on a single carrier such as, for example, an aircraft. The system utilizes two on board short baseline interferometers (SBIs). A linking means interconnecting the two interferometers for forming a third interferometer. An on board data processor receives the phase information, calculates phase error correction information and determines the direction and range to the electromagnetic energy emitter. The system allows bearing to be determined instantaneously. But, as the raw measurements are subject to error, temporal processing is done in a data processor to provide direction and range information having acceptable circular error probable attributes.

BRIEF DESCRIPTION OF THE DRAWINGS

Other objects and features of the invention will become more readily understood from the following detailed description and appended claims when read in conjunction with the accompanying drawings, in which:

Referring now to FIG. 1, an emitter locator system (ELS) carrier 10, which may be, for example, an airplane houses two short baseline interferometer systems 12 and 14 (FIG. 2). The short baseline interferometer systems 12 and 14, as will be hereinafter described in detail, have elements connected to a phase detector to form a long baseline interferometer system. A short baseline interferometer system is considered to have a baseline length of up to 50 wavelengths at the center frequency; a long baseline interferometer is one having a length of more than 50 wavelengths.

Figure 1:
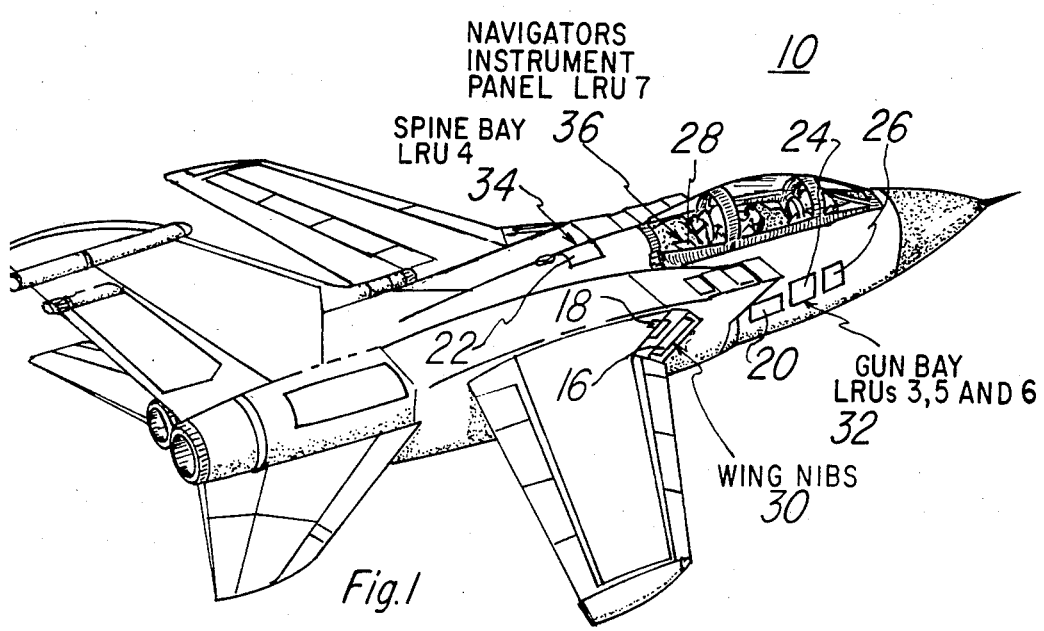
FIG. 1 is an isometric view of an emitter locator system (ELS) carrier showing suitable locations for the system components.
Figure 2:
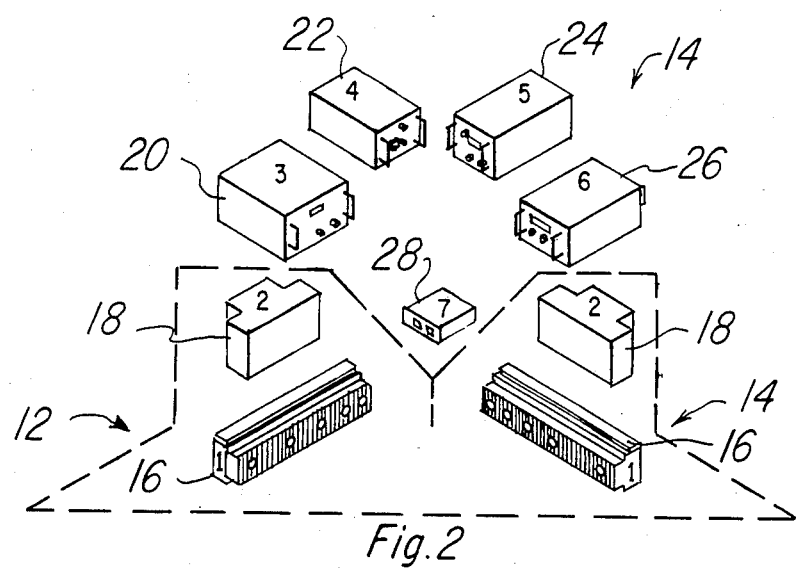
FIG. 2 shows the ELS components in box form.

The short baseline interferometer systems 12 and 14 each have receivers including an antenna and RF converter subsystem 16 and a delay line and cued analyzer 18; they share in common a channelizer 20, a frequency synthesized and local oscillator 22, a processor 24, a power supply 26 and a control panel 28.

As shown in FIG. 1, to provide a stable baseline, the two antenna and RF converter subsystems 16 and two delay line and cued analyzers 18 are mounted in the wing nibs 30. Only one of the wing nibs is shown.

The channelizer 20, processor 24 and power supply 26 are mounted in the gun bay 32. While, the local oscillator 22 and the control panel 28 are mounted, respectively, in the spine bay 34 and the navigator's instrument panel 36.

Figure 3B:
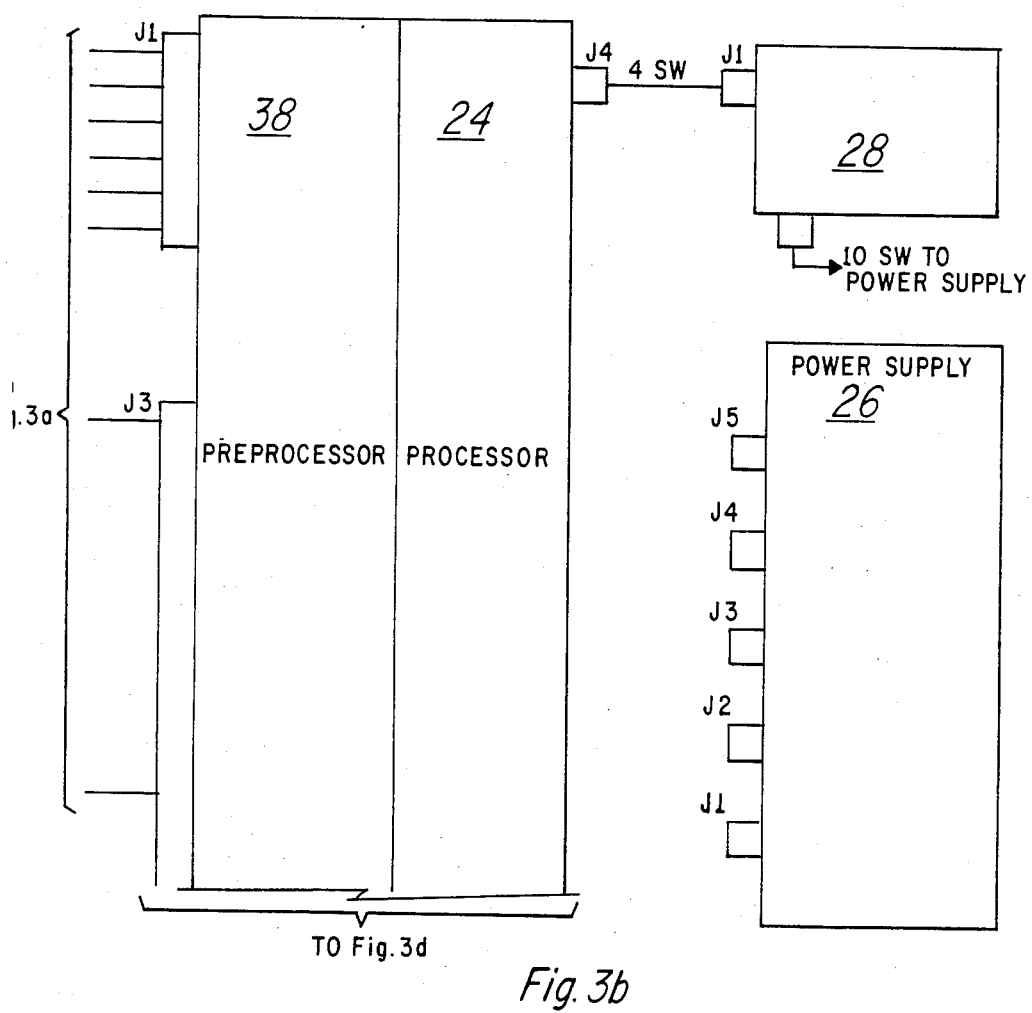
FIG. 3 is a block diagram of the ELS component partitioning.
Figure 3C:
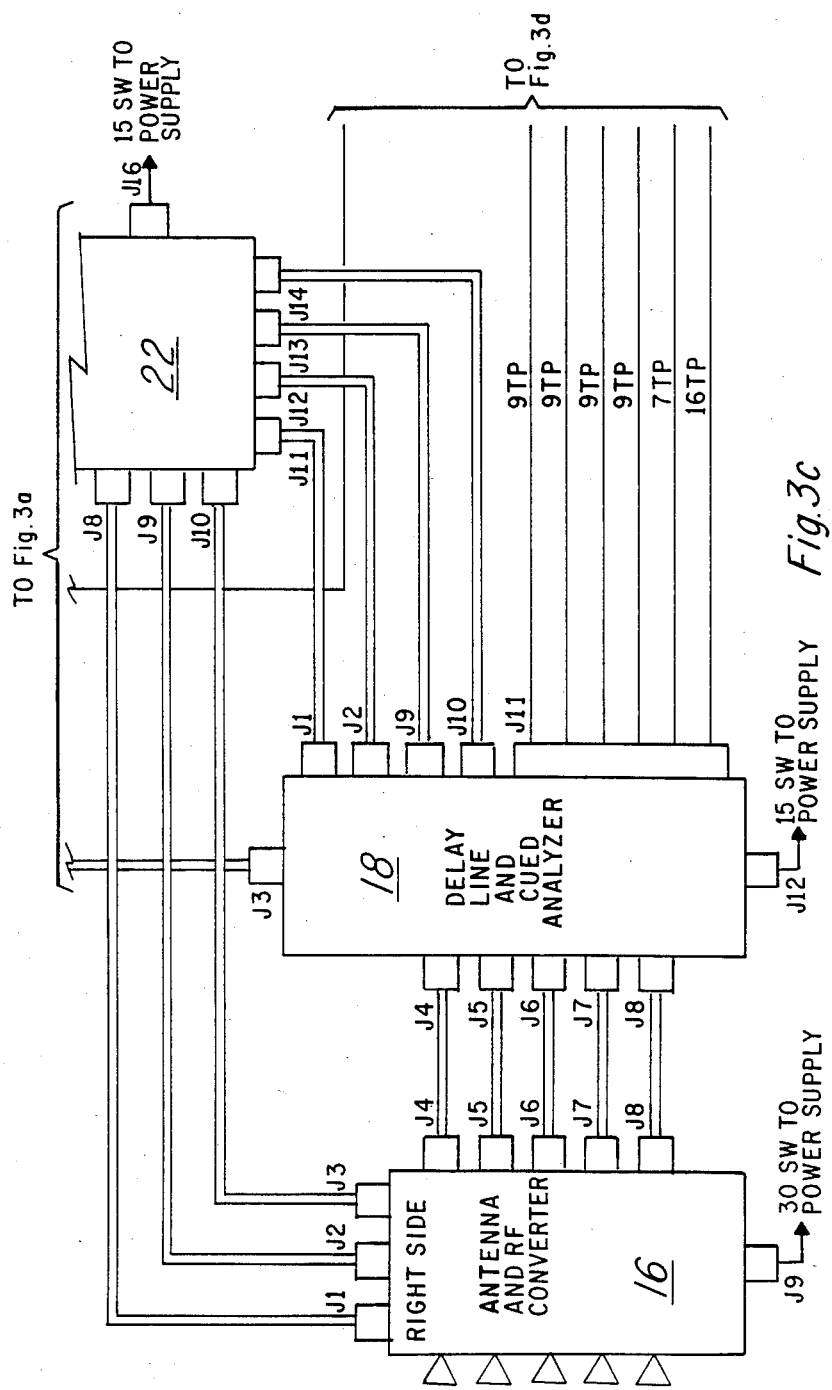

Thus, as shown in FIG. 3, the antenna and RF converter subsystems 16 and channelizer 20 have output terminals connected to the delay line and cued analyzer subsystems 18. The delay line and cued analyzers have output terminals connected to input terminals of a preprocessor 38 and processor 24. The processor 24 output is connected to the control panel 28. The frequency synthesized and local oscillator 22 has output terminals connected, respectively, to the antenna and RF converters 16, delay and cued analyzers 18, channelizer 20 and preprocessor 38. The power supply 26 provides power to these components and in addition thereto to the control panel 28.

ANTENNA AND RF CONVERTER SUBSYSTEMS

As the antenna and RF converter subsystems 16 are identical in construction only one is described in detail.

Figure 4:
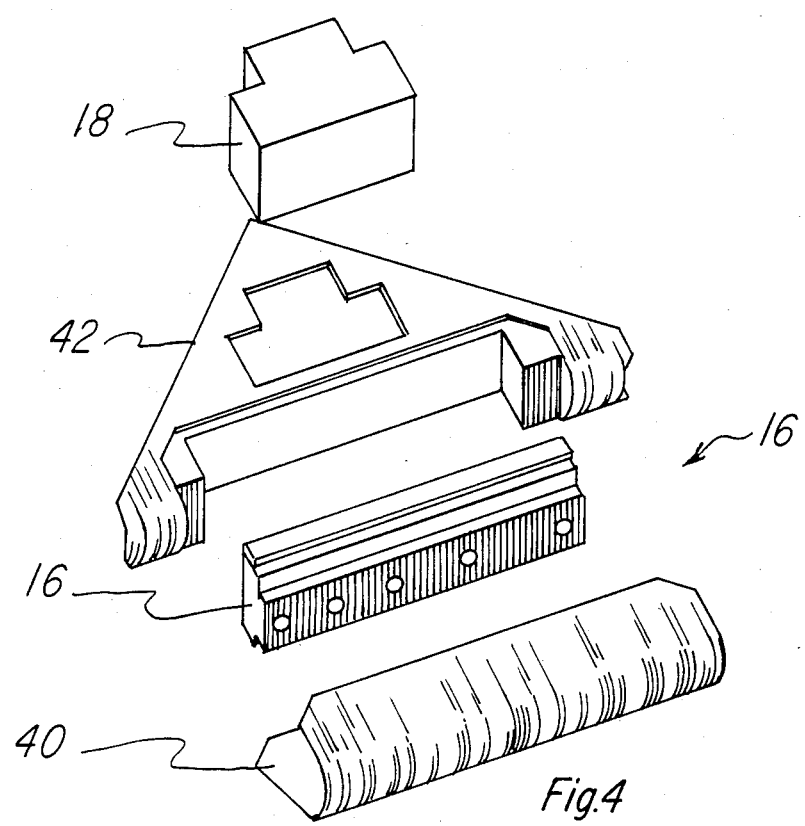
FIG. 4 is an exploded view of a wing arrangement for the ELS components located in the wing.

The antenna and RF converter subsystem 16 (FIG. 4) includes a radome 40, antenna and RF converter subsystem 16, delay line and cued analyzer 18 and support member 42. The support member 42 is attached to the airframe and supports the delay line and cued analyzer subsystem 42, the antenna and RF converter subsystem 16 and radome 40. The delay line and cued analyzer is supported behind and in close approximation to the antenna and RF converter subsystem 16 to minimize the lengths of connecting cables.

Figure 5A:
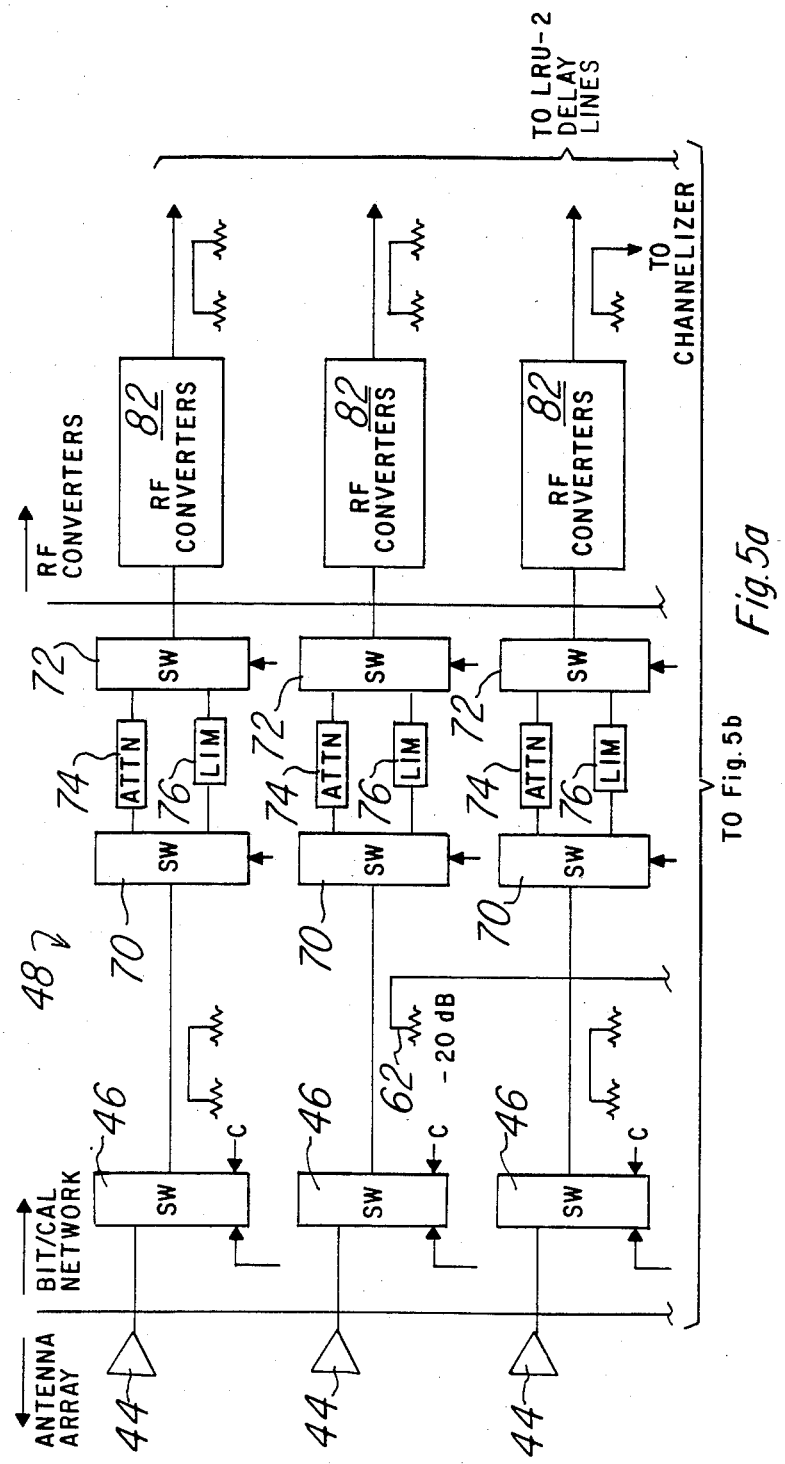
FIG. 5 is a detailed block diagram of the built in test/calibration in relation to the antenna array and RF converters.
Figure 5B:
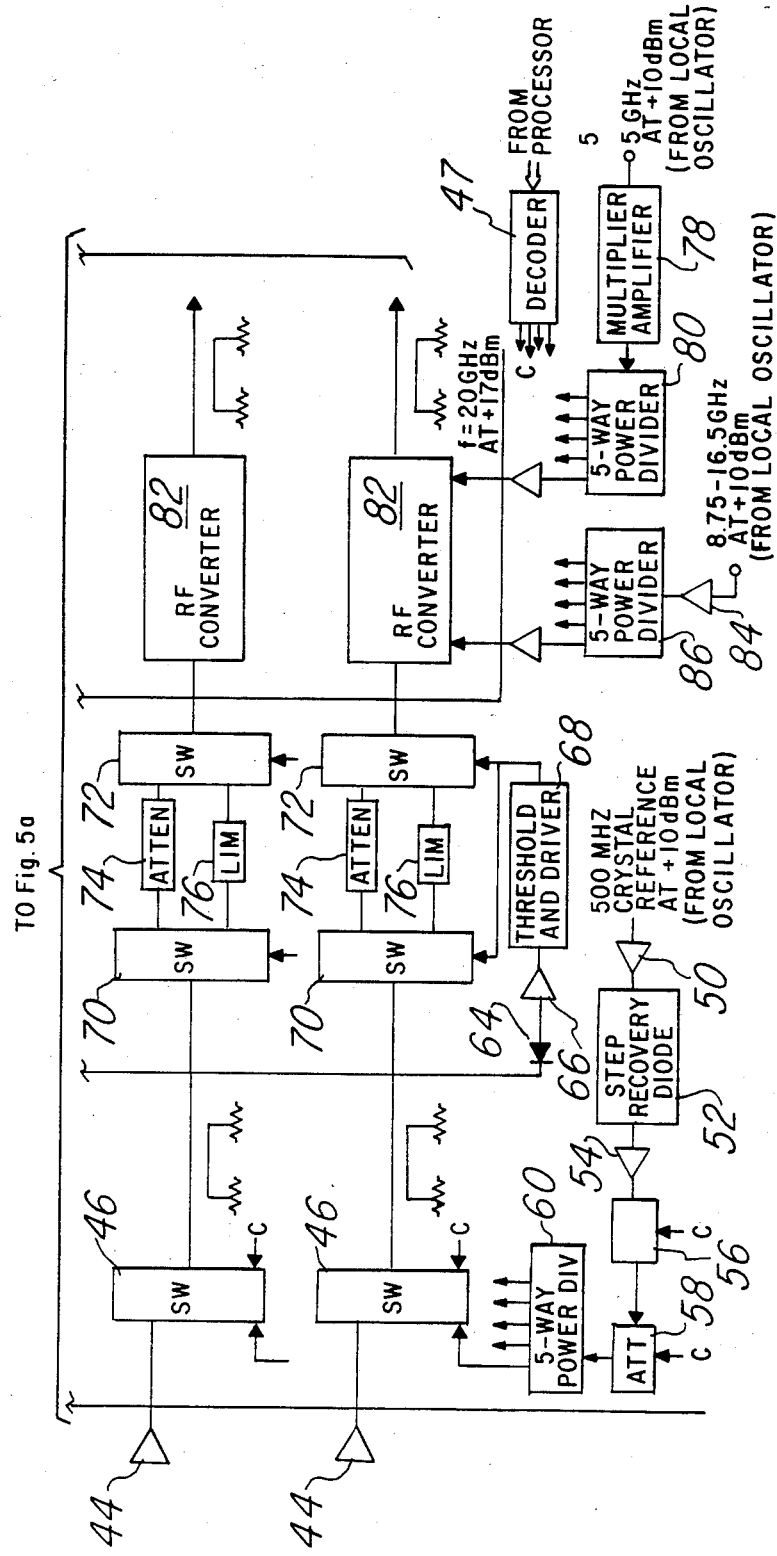
Figure 6:
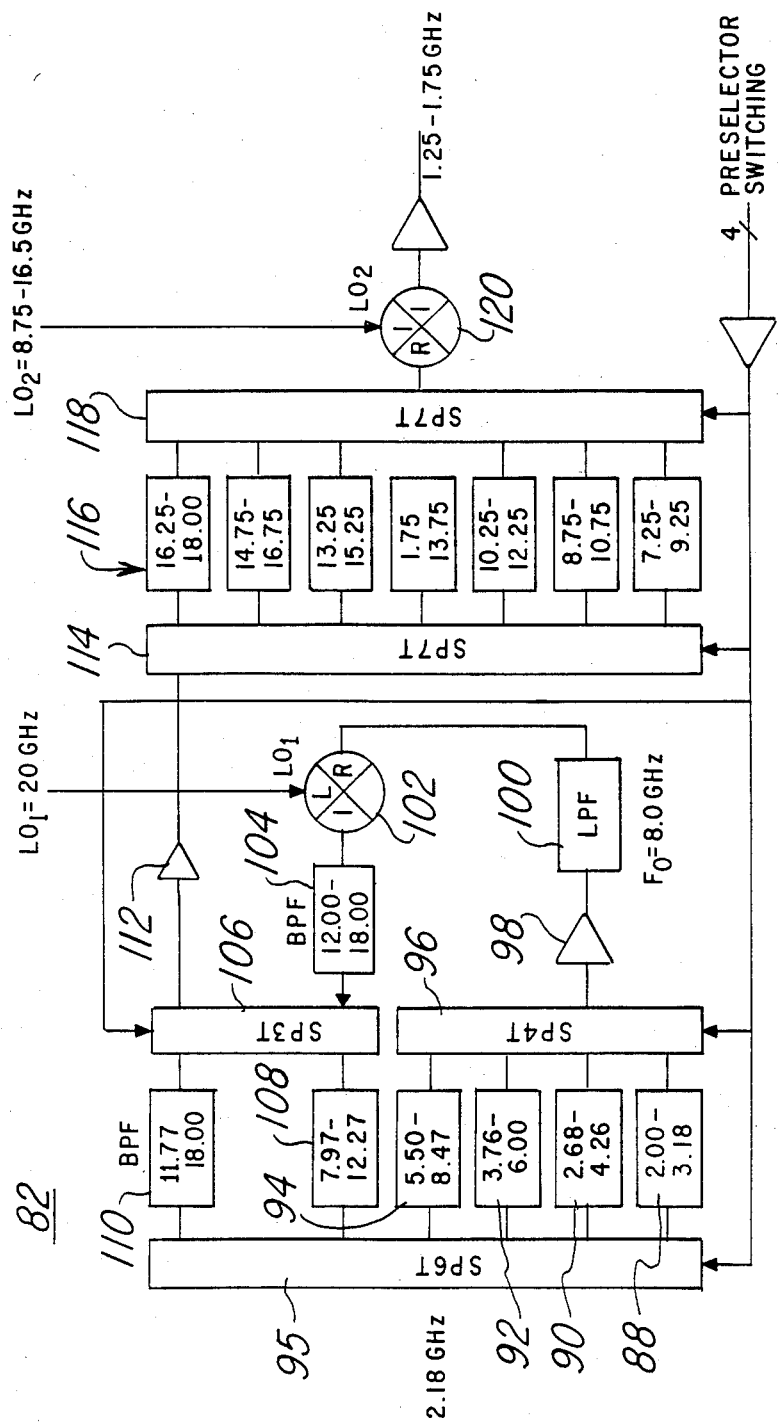
FIG. 6 is a detailed block diagram of the RF converters.

The antenna and RF converter subsystem 16 (FIGS. 5 and 6) includes an array of five antennas 44. The antennas are, for example, two-filament, planar, archimedian, cavity-backed spiral antenna. These spiral antennas are well known devices and need not be discussed in detail. The array of antennas are connected to a corresponding array of absorptive single-pole triple-throw switches 46 of a built-in-test and calibration circuit 48. The third input of all the switches is a built-in-test signal derived from a 500-MHz picket-fence generator to create a spectrum, for example, from 2 to 18 GHz with lines spaced every 500 MHz. The array of switches 46 are controlled by a decoder 47 which receives coded signals from the preprocessor 38 (FIG. 3).

The 500-MHz crystal-reference oscillator signal is obtained from the local oscillator 22 (FIG. 3) and amplified in amplifier 50 (FIG. 5) to +30 dBm (1 watt). A step recovery diode 52 is connected to the amplifier 50 for generating the frequency spectrum. The output of the step recovery diode is amplified in amplifier 54 and modulated in modulator 56.

A broadband, wide dynamic range voltage controlled attenuator 58 is connected to the modulator 56 for attenuation. A 5-way power divider 60 is connected to the attenuator 58 for distributing the stepped frequency signals to the array of switches 46.

An automatic RF attenuator control includes a −20 dB directional coupler 62 for tapping a signal sample from one channel. A detector 64 is connected to coupler 62 for demodulating the sample and a log amplifier 66 is connected to the detector 64 for log amplification. A reference comparator 68 is connected to the log amplifier for comparing the detected signal to a reference voltage.

Two arrays of single pole double throw switches 70 and 72 are connected to the reference comparator 68. Arrays of attenuators 74 and limiters 76 are connected between the arrays of switches 70 and 72. Thus, when a threshold is crossed in the reference comparator 68, the switches 70 and 72 are thrown to the attenuator position and 30 dB of attenuation is inserted in the RF channels to provide a total system dynamic range of 90 dB for instantaneous protection of strong emitter signals. In the other position the switches are thrown to the limiter position and the array of passive limiters protect the receiver against strong signals and burn-out if the emitter locator system is not operating.

Finally, the built-in-test/calibration network includes local oscillator signal multiplication and distribution networks for the array of RF converters. One network includes a multiplier amplifier 78 connected to the local oscillator 22 (FIG. 3) for multiplying a 5 GHz signal at 10 dBm by four to provide a 20 GHz signal to a 5-way power divider 80. The power divider 80 distributes the signal to each one of the five RF converters 82 of the array of converters. A second network includes an amplifier connected to the local oscillator 22 (FIG. 3) for amplifying an 8.75 to 16.5 GHz frequency synthesized by the local oscillator. A five way power divider 86 (FIG. 5) provides the 8.75 to 16.5 GHz as a local oscillator signal to each of the RF converters.

The array of RF converters 82 (FIG. 6) includes four three pole filters 88, 90, 92 and 94 having inputs connected to a single pole six way switch 95. The frequencies of these filters are selected to prevent image responses and to protect the 2 to 8 GHz amplifier from high level second harmonic signals. A single pole four throw switch 96 is connected to the filter for sequentially switching the filters output to an amplifier 98 for signal restoration. A low pass filter 100 having a center frequency of 8 GHz connected to amplifier 98 filters the amplified output. A mixer 102 mixes the 2 to 8 GHz filtered output with a 20 GHz signal obtained from the local oscillator 22 (FIG. 3) for up-conversion to 12 to 18 GHz. High level mixing is employed to achieve a high two-tone third-order intercept point from the mixer.

A band pass filter 104 is connected to the mixer 102 and a single pole three way switch 106 is connected to the filter 104. Filters 108 and 110 have inputs connected to switch 95 and outputs connected to switch 106. Thus, the input spectrum from 7.97 to 18 GHz is defined by these filters that are switched for a selected segment.

An amplifier 112 is connected to switch 106 to amplify the band from 7.97 to 18 GHz. A single pole 7 way switch 114 is connected to the amplifier and seven high selectivity 8-pole filters 116 are connected to the switch 114. The seven filters 116 are switched by switch 118 and their outputs mixed in mixer 120 with a local oscillator signal from 8.75 to 16.5 GHz to provide an IF baseband of 1.25 to 1.75 GHz.

DELAY LINE AND CUED ANALYZERS

Figure 7:
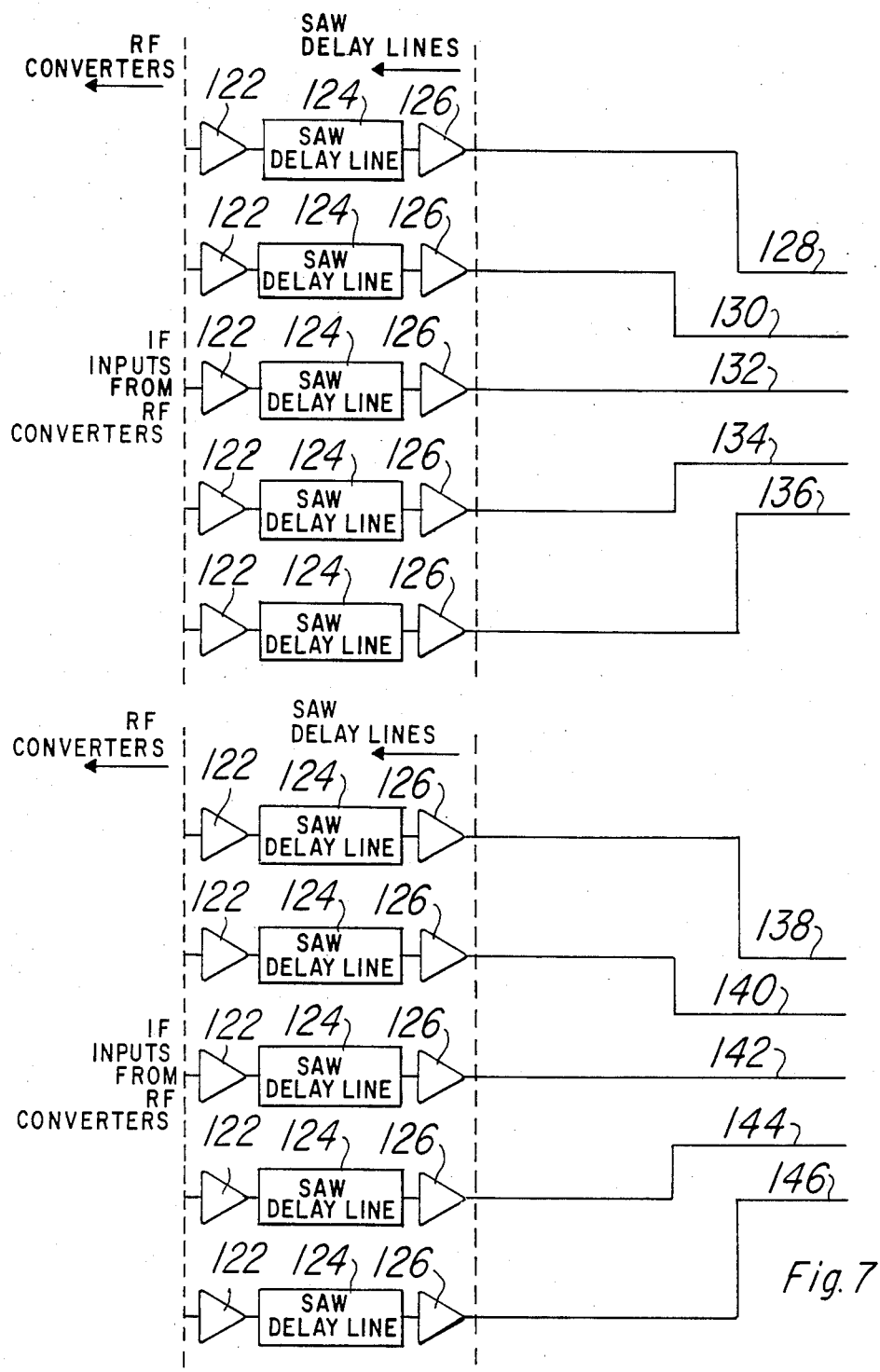
FIG. 7 is a block diagram of the surface acoustic wave (SAW) delay lines for the cued analyzer.

As the left short baseline interferometer (SBI) is connected by an electronic phase detector to the right SBI in the cued analyzers both SBI's delay lines and cued analyzers are shown with like parts carrying the same reference numbers. The IF baseband of 1.25 to 1.75 of the RF converter is connected to amplifiers 122 (FIG. 7) of the delay line means to restore the IF signals to working levels. Surface acoustic wave (SAW) delay lines 124 are connected to the amplifiers 122 to store the IF signals. While amplifiers 126 are connected to the delay lines 124 to overcome the loss in the delay lines and provide sufficient output power to achieve the required system dynamic range. Leads 128, 130, 132, 134 and 136 connect the amplifiers 126 of the left SBI to mixers 148, 150, 152, 154 and 156 of the left SBI's cued analyzer. Leads 138, 140, 142, 144 and 146 connect the amplifiers 126 of the right SBI to mixers 158, 160, 162, 164 and 166 of the right SBI's cued analyzer.

The left and right cued analyzers 168 and 170, respectively, are five channel, phase matched, superheterodyne processors capable of processing pulse or continuous wave (CW) information.

Figure 8A:
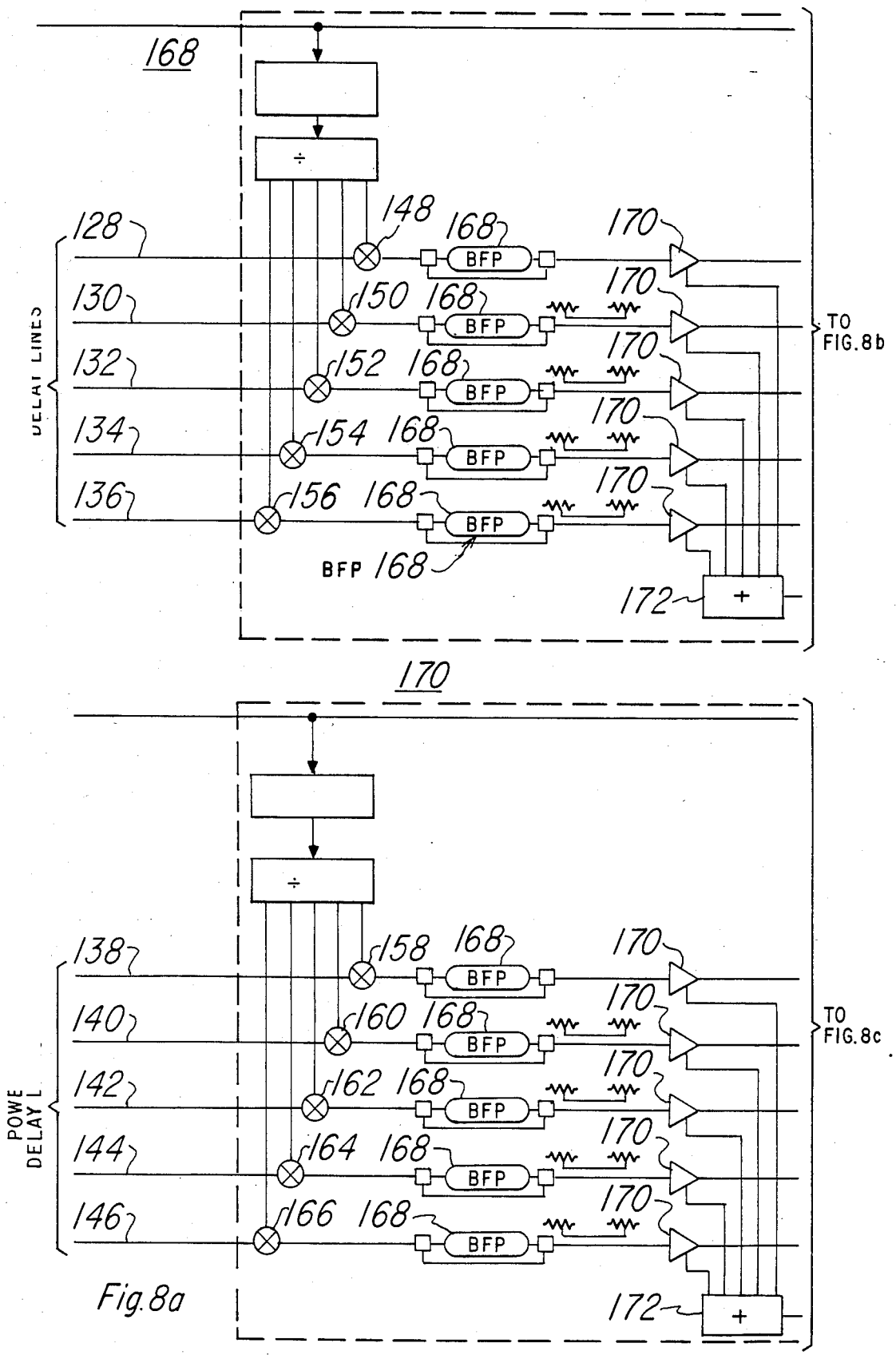
FIG. 8 is detailed block diagram of the cued analyzer circuit.
Figure 8B:
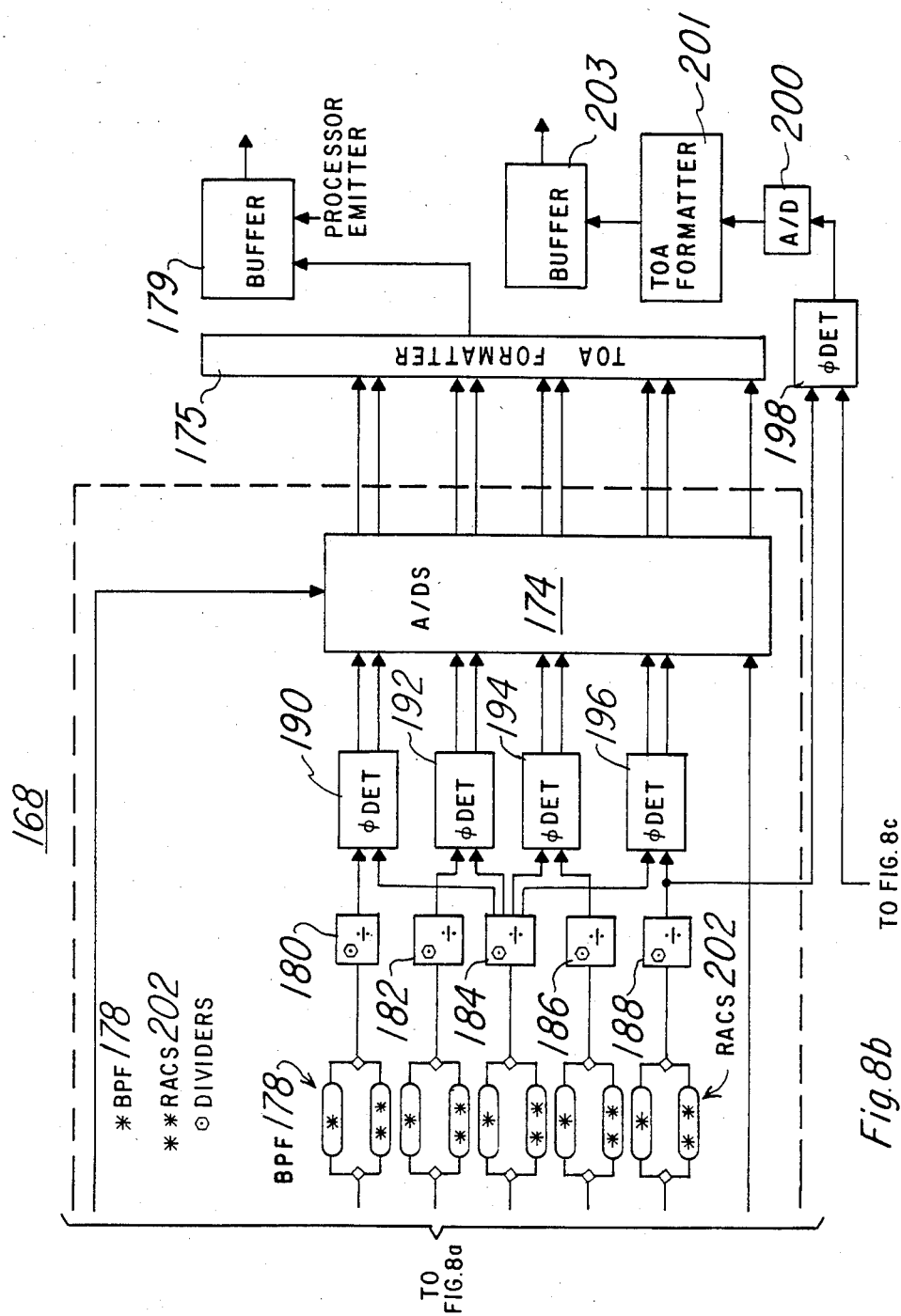
Figure 8C:
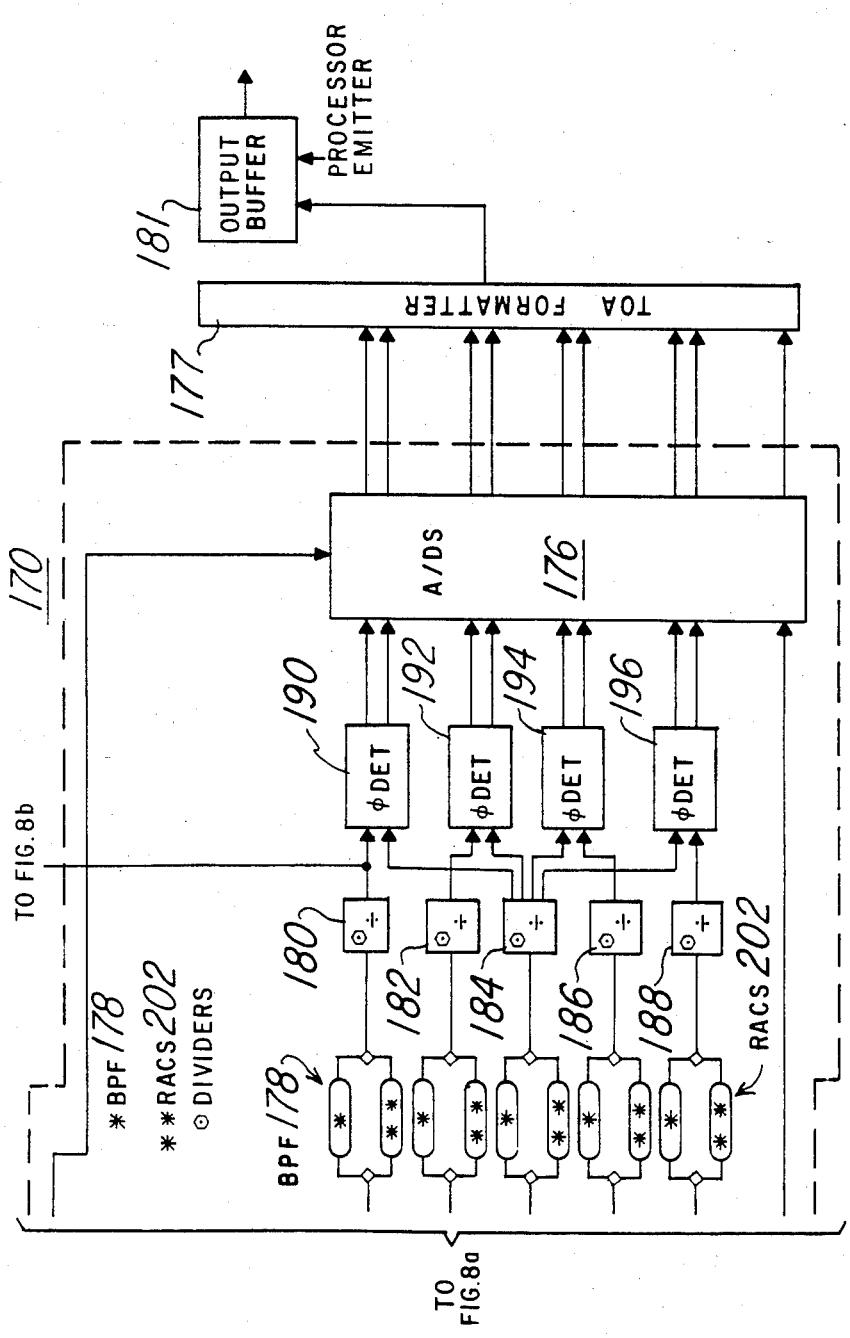

For pulse operation the mixers of the left and right SBIs are connected to a second local oscillator signal derived from the frequency synthesizer local oscillator for down conversions to 410 MHz. A corresponding number of 20 MHz bandpass filters 168 are connected to the mixers of the left and right SBIs for filtering prior to log amplification by log amplifiers 170. Summers 172 are connected to the log amplifiers 170 of the left and right SBIs for summing the log outputs of all the channels for sum-of-logs processing. Analog to digital (A/D) converters 174 and 176 are connected to the summers 172 for A/D conversion. The resultant 7 bit words are sent to the processor 22 (FIG. 3) where they are subtracted to provide amplitude sensing that augments the coverage of the emitter locator system provided by phase sensing. Bandpass filters 178 are also connected to the log amplifiers 170 for additional 20 MHz filtering. Dividers 180, 182, 184, 186 and 188 are connected to the filters 178 as shown in FIG. 8. And finally, phase detectors 190, 192, 194, 196 and 198 are connected to the dividers as follows: phase detectors 190, 192, 194 and 196 have input terminals connected, respectively, to dividers 180, 182, 186 and 188 for the SBIs. Also, phase detector 198 has input terminals connected to dividers 188 and 180 of the left and right cued analyzers for the LBI. Analog to digital converter 200 is connected to the phase detector 198 and the analog to phase detectors 174 and 176 are connected, respectively to the phase detectors of the left and right cued analyzers. The analog to digital converters 174, 176 and 200 are connected to reformatters 175, 177 and 201 where the digital signals are reformatted. Buffers 179, 201 and 181 are connected to the reformatters for buffering the reformatted signals.

For the continuous wave mode of operation, the bandpass filters 168 and 178 of the left and right cued analyzers are bypassed and reflective array compressors (RACs) 202 inserted in the filters 178 bypass. The local oscillator 22 (FIG. 3) has a matching expander which is activated to provide a linear FM signal that is summed to a 115 GHz crystal oscillator to generate the local oscillator for continuous wave detection. The five phased related signals are mixed down by this FM local oscillator to provide a "chirped" IF in the proper direction so that pulse compression will take place in the RACs. The output of the RACs, which are now pulses, are then processed in the same manner as pulsed-emitter signals.

The channelizer, which is, for example, a surface acoustic wave (SAW) channelizer, performs high probability of intercept frequency discrimination on the incoming signal to within 20 MHz and converts this frequency measurement into a digital word for tuning the fast settling local oscillator.

Figure 9A:
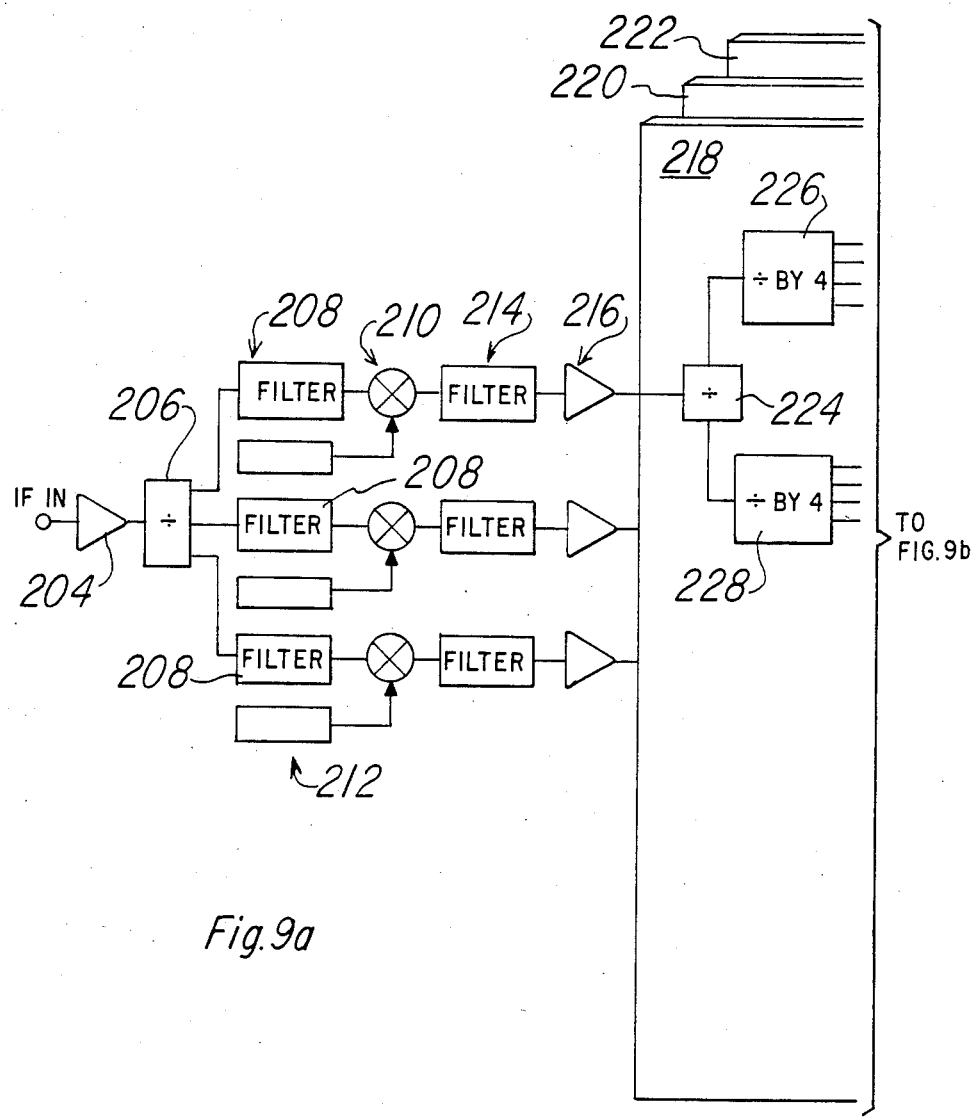
FIGS. 9a and 9b constitute a detailed block diagram schematic of the channelizer circuit.

An amplifier 204 (FIG. 9a) is connected to one of the RF converters 82 (FIG. 5) for receiving an undelayed down converted input signal. A divider 206 (FIG. 9a) divides the signal three ways. Preselector filters 208 filter the divided signals to prevent imaging. Mixers 210 are connected to to the filters 208 and local oscillators 212. Filters 214 are attached to the mixers 210 for filtering the beat signal output of the mixers. Amplifiers 216 are connected to the filters 214 for restoring the filtered signals to working levels. Three filter trees 218, 220 and 222 are connected each to an amplifier 216.

As each of the filter trees 218, 220 and 222 are identical only one is described. A power divider 224 divides the IF frequency signals. Two divide by four dividers 226 and 228 are connected to the power divider 224 for dividing the IF signal into eight outputs. Eight slot filters 230 are connected to the two divide by four dividers 226 and 228. Each slot filter 230 contains an amplifier 232 connected to one of the divide by four dividers outputs. A slot filter 234 is connected to the amplifier 232. Thus, a bank of slot filters 234 are provided to perform frequency discrimination throughout the 500 MHz input bandwidth. Each one of the 24 slot filters has a nominal bandwidth of 20 MHz. Amplifier 236 is connected to the slot filter 234 and a splatter guard 238 is connected to the amplifier.

The splatter guard 238 is used to guard against false triggering caused by spectrum splatter. Spectrum splatter results from narrow pulses with fast rise times and frequency components that can overlap more than 10 filters. The processor 22 (FIG. 3) provides reset signals 240 and control (shut down) signals 242 to the splatter guard circuits that allow any or all of the splatter guard thresholds to be inhibited. This gives the processor the prerogative of eliminating high duty cycle signals that would tie up digital processor assets.

Figure 9B:
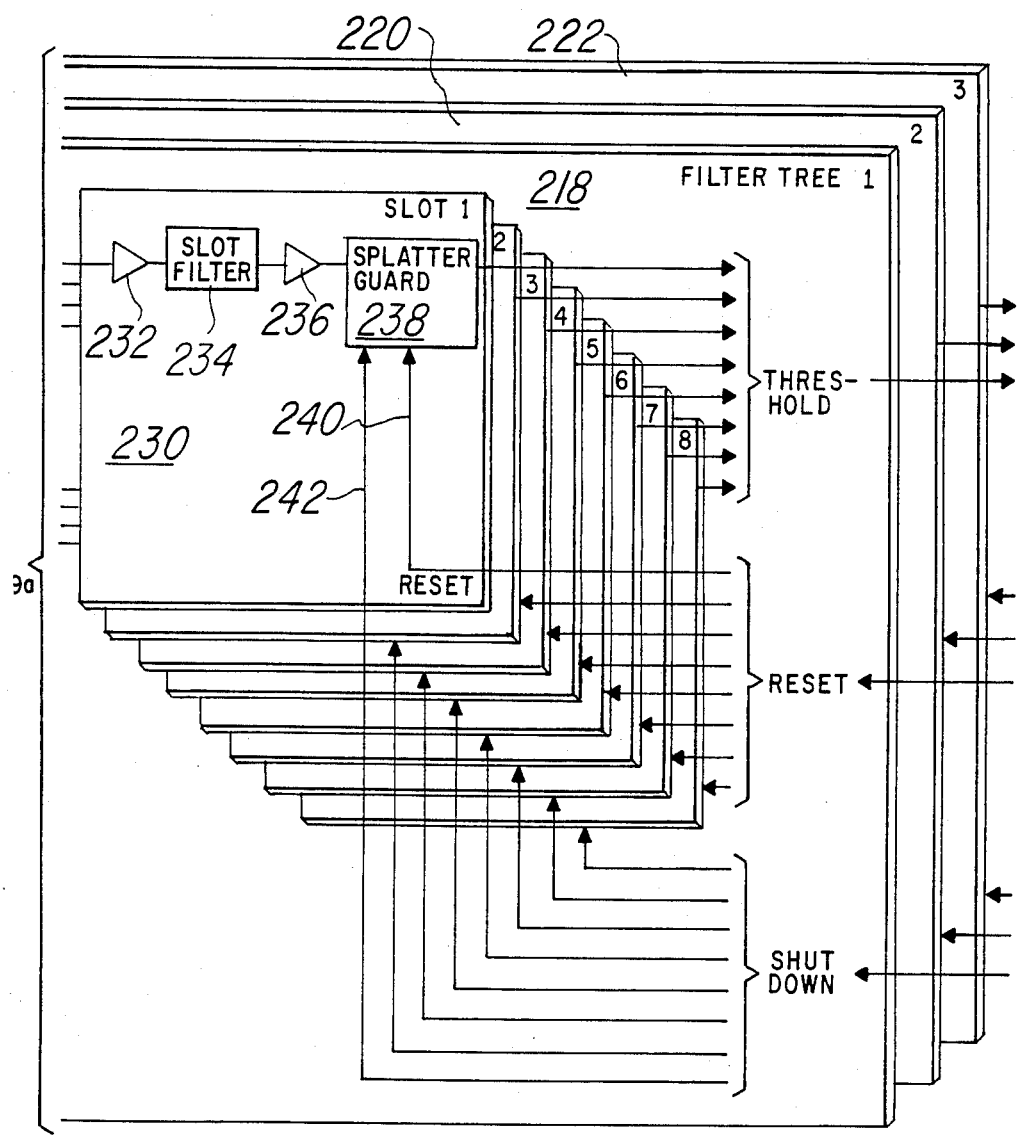
Figure 9C:
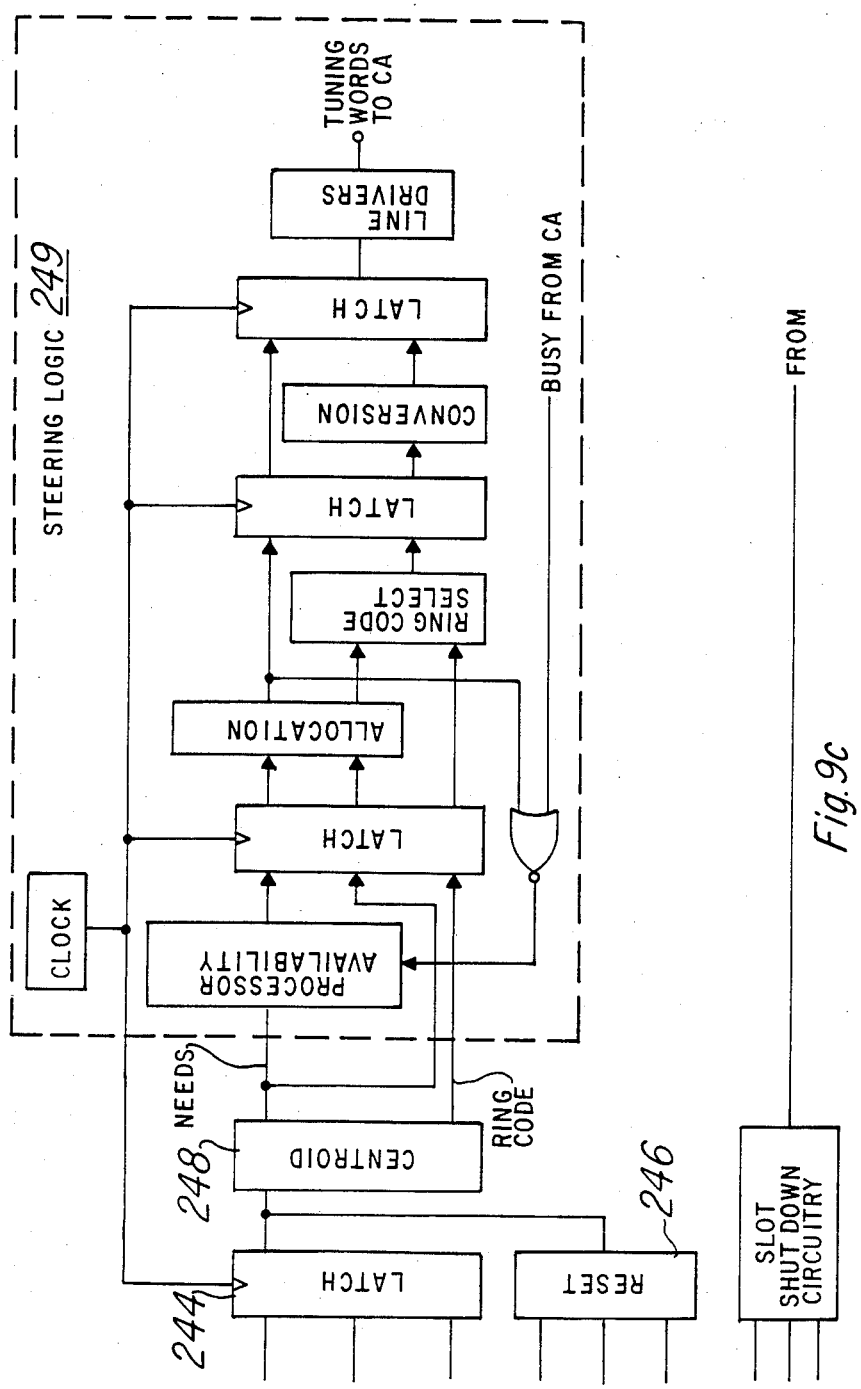

A latch 244 (FIG. 9b) is connected to the splatter guards 238. A reset means 246 for the splatter guards and steering logic including a centroid 248 are connected to the latch 244. The reset means 248 is connected to the splatter guard circuit 238. The centroid includes the centroiding algorithm to provide an accurate frequency measurement on multiple signal threshold crossings. The steering logic 249 then looks at the available cued analyzers and hands off the coarse frequency to a cued analyzers that is not busy. The cued analyzer handoff is a digital control word to the frequency synthesizer local oscillator that tunes the cued analyzer.

FREQUENCY SYNTHESIZER LOCAL OSCILLATOR

Figure 10:
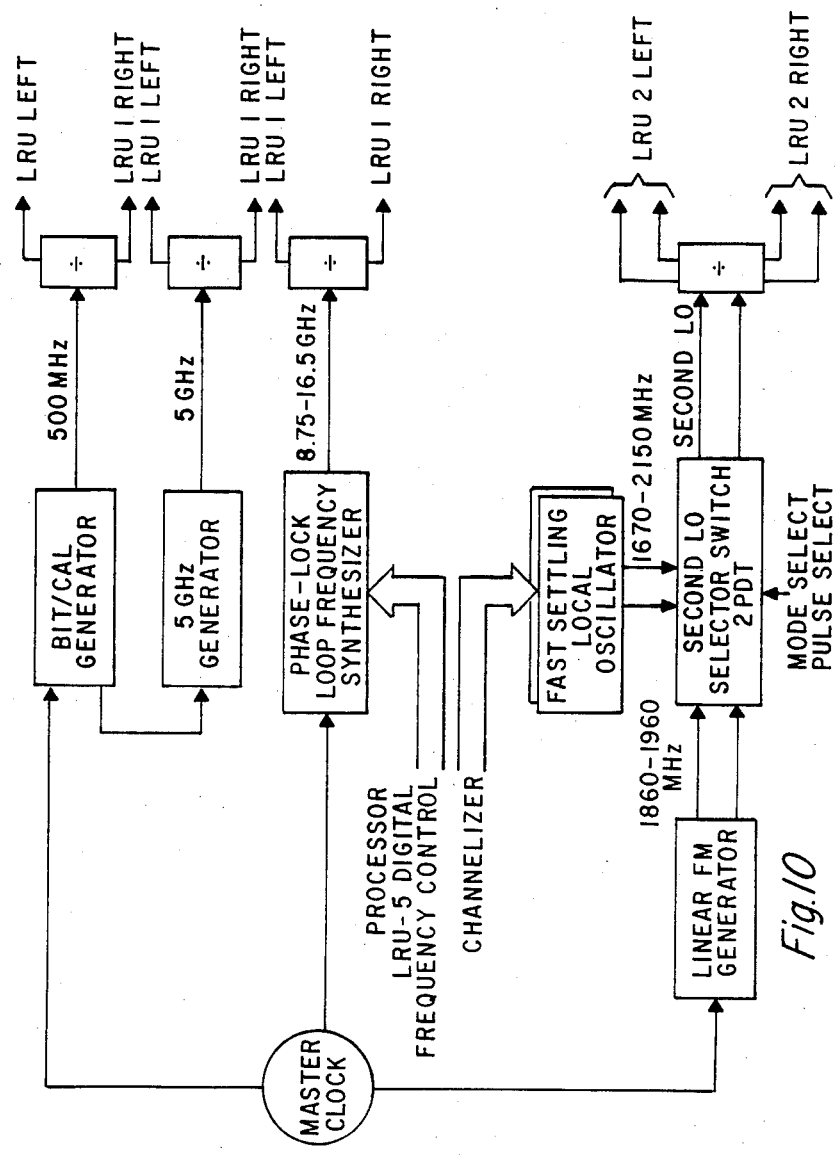
FIG. 10 is a block diagram of the local oscillator.

The local oscillator provides fixed, crystal referenced signals for the critical system functions. The local oscillator 22 (FIG. 3) provides the built in test/calibration (BIT/CAL) subsystem a 500 MHz crystal reference at +10 dBm and a 5 GHz signal that is multiplied to 20 GHz in the BIT/CAL subsystem for use by the RF converters to up convert the 2 to 8 GHz input band into the preselection filters. The local oscillator also contains a phase locked loop frequency synthesizer that enables the local oscillator to provide an 8.75 to 16.5 GHz at +10 dBm for the first down conversion function in the RF converters. This digitally controlled frequency synthesizer can step in any increments of 5 MHz with a 50 microsecond tuning speed. Finally, the local oscillator provides the two sets of second conversion local oscillator signals required by the cued analyzers of FIG. 9a. For pulse reception, 24 fast settling local oscillator signals are generated by direct synthesis and switch within 200ns for cued receiver operation. For CW reception a linear chirp from 1.860 to 1.960 GHz is generated to resolve CW signals closely spaced in frequency. A block diagram of the local oscillator is shown in FIG. 10.

PROCESSOR

The processor 22 (FIG. 3) is, for example, a digital processor for receiving digitized pulse reports from the phase detector's analog to digital converters. A pulse report is the coded parametric characteristics of an intercepted pulse. The report can contain, for example, digitized information of a pulse's frequency, electrical phase, intensity, pulsewidth, and time of arrival. Phase information is first compensated, converted to mechanical angle, and resolved to inertial coordinates prior to being sent to the processor. The digital processor includes a presorter, sort processors, and executive processors. The processor sends the pulse reports to the presorter where they are grouped according to their azimuth position and their frequency. Each of these clusters is then deinterleaved into pulse trains by the sort processors. The sort processors pass the characteristics of each pulse train to the executive processor that identifies the source of each pulse train, prioritizes the sources, and communicates this data.

FLOW DIAGRAM

Figure 11:
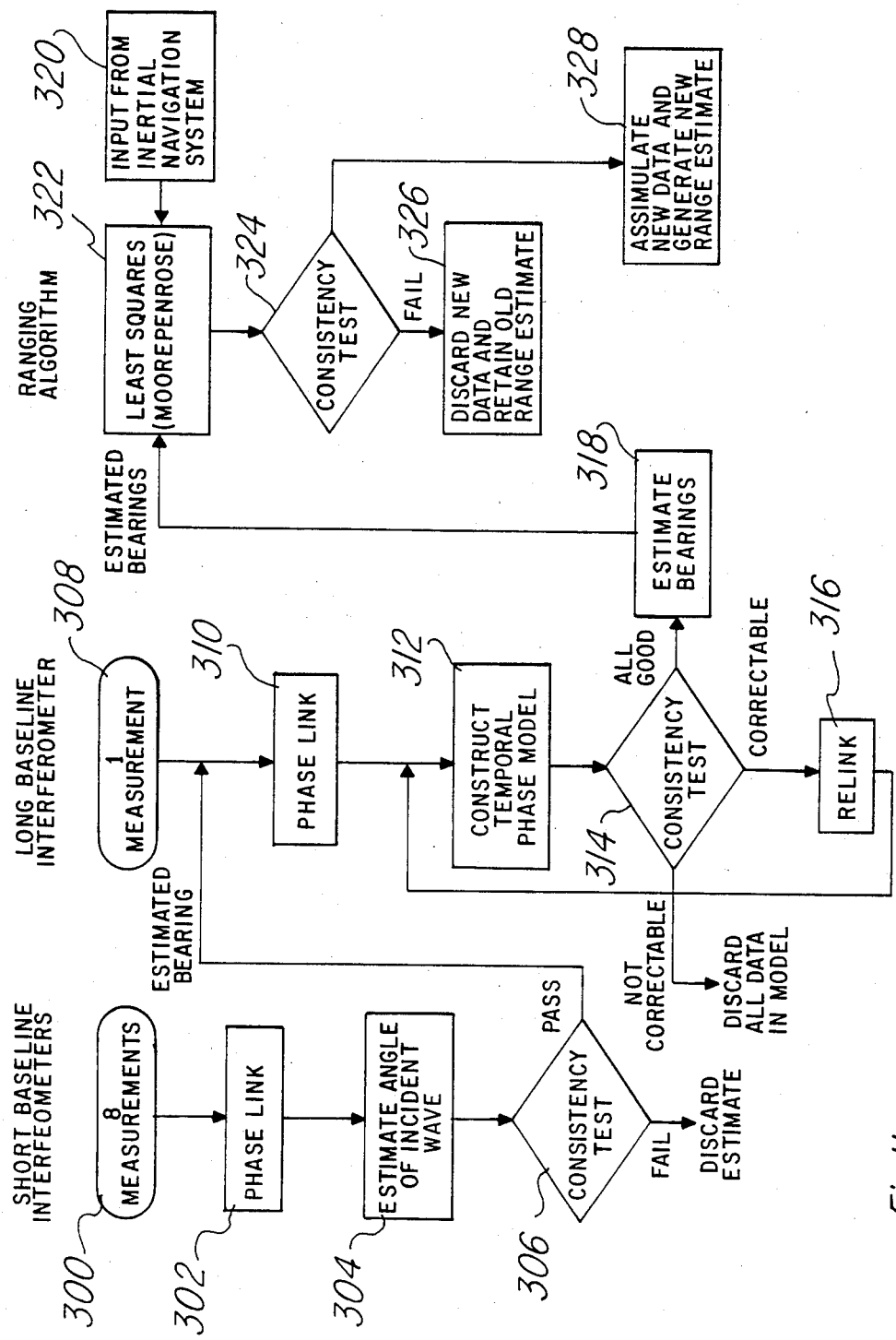
FIG. 11 is a flow diagram of the high accuracy ranging system.

Before describing the flow diagram, it is to be noted that errors may exist in the data paths of the system at three levels. These levels are associated with the short baseline interferometers (SBIs), long baseline interferometer (LBI) and ranging algorithm. The flow chart of FIG. 11 provides for the detection and elimination of the errors at all three levels assuming that the CEP is minimized.

The flow diagram (FIG. 11) for the high accuracy ranging system starts 300 (level 1) with eight measurements from the short baseline interferometers each having five antenna elements. Measurements within each SBI are processed 302 to restore the measurements to total phase and then processed 304 to estimate the angle of incident wave (theta). Owing to the conservative spacing of antenna elements in the SBI's the probability of phase linking errors is normally very small. But they may occur occasionally as a result of multipath or signal masking. These errors are highly detrimental to subsequent processing. Thus, a consistency test decision 306 is made as to whether phase linking errors have occurred. If the estimate fails the test it is discarded; if it passes the test, the estimate is passed to the long baseline interferometer path (level 2).

The long baseline interferometer path starts with one measurement 308 of the phase difference between selected receivers within the SBIs. This measurement is simultaneous with the theta estimate determined at level 1. Because of the wide spacing of the LBI receivers this measurement is aliased, that is, it differs from the true phase by an unknown integral multiple of 360 degrees. The phase linker 310 receives the theta estimate together with the phase measurement (phi) and adds to the aliased measurement an integral multiple of 360 degrees in such proportion as to restore it to total phase. Because the accuracy of the phase restoration (LBI phase linking) process is subject to possible error, the results are processed to detect and correct LBI phase linking errors. This processing utilizes an ensemble of restored measurements collected over an interval of time.

For this purpose the restored measurements are stored for subsequent processing. Then a temporal phase model is constructed 312 from the ensemble using the least mean squares method. The presence of phase linking errors is determined 314 by computing the average squared difference between the measurements and model. The average squared difference is compared to a predetermined threshold. If the computed value is below threshold the data are judged to be properly phase linked and are passed to estimate bearings 318; if not the data are passed to relink 316 for phase linking error detection and correction.

Figure 15:
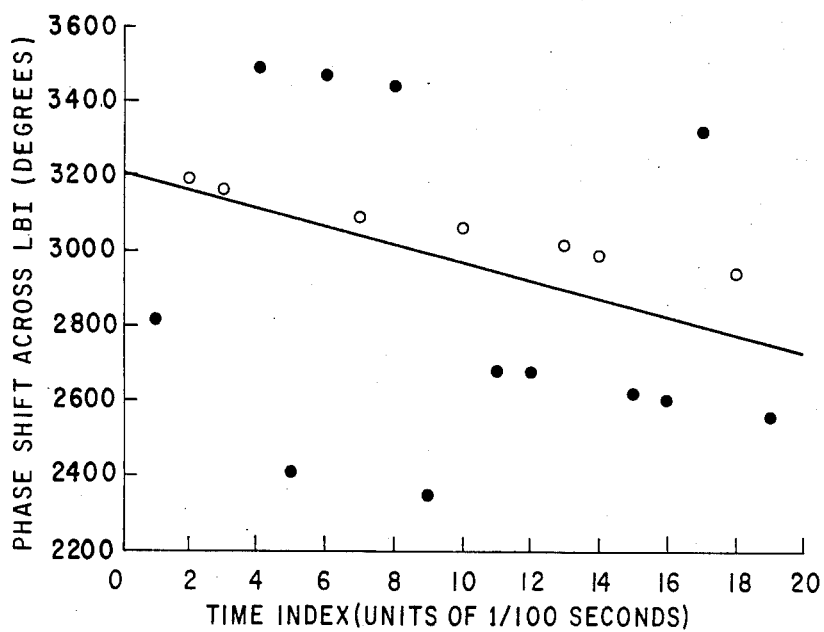
FIGS. 15, 16 and 17 are charts of the temporal phase models for the first, second and third passes, respectively.
Figure 16:
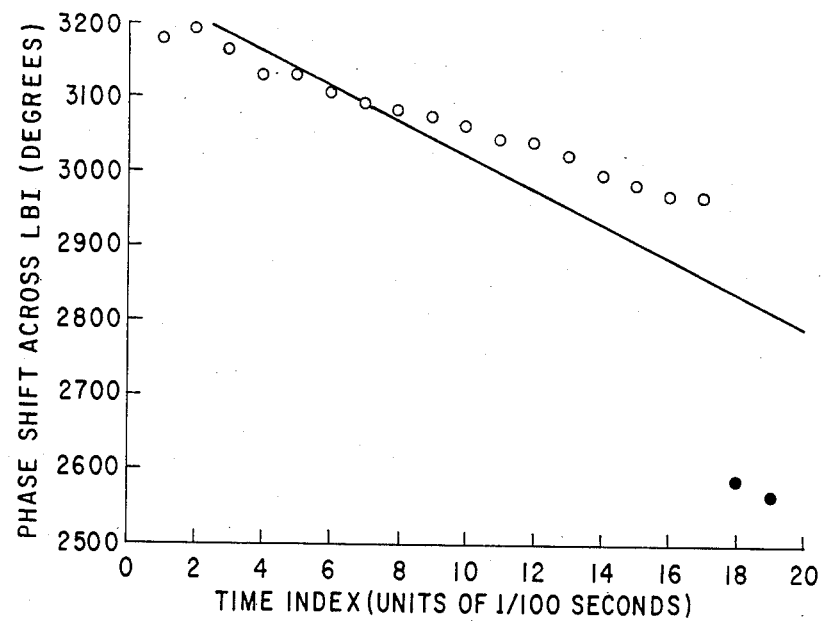
Figure 17:
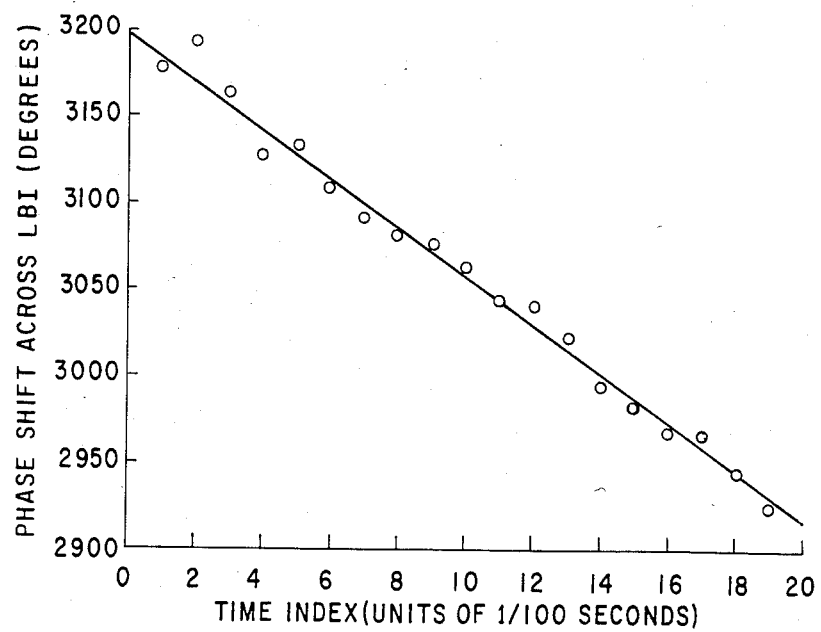

Relink 316 evaluates each individual restored LBI phase measurement relative to the model. If a correction, comprised of an integral multiple of 360 degrees, when added to the measurement places the corrected measurement closer to the model such correction is made within 316; if not the original data is considered correct. When all measurements have been processed in this manner, they are returned to 312 for reconstruction of the temporal phase model (FIGS. 15, 16 and 17). This procedure is repeated until either estimate bearing 318 is reached or the data are determined to be uncorrectable and the system awaits further level 1 data and concurrent measurements 308. When the restored LBI phase measurements have been validated by the temporal phase model, they are input to estimate bearing 318. Here the interferometer equation is solved for the angle of the incident wave and the computed angle is passed to the ranging algorithm at level 3.

Inputs to the ranging algorithm (level 3) are the bearing estimates from 318 and the carrier position and heading information from the inertial navigation system 320. The measured bearings, which are relative to the carrier, are related to a fixed coordinate system using the measured bearings from 320. These are input, with carrier position (also from 320) to the ranging algorithm 322 (Moore-Penrose) which computes the location of the emitter by a least squares procedure. The ranging algorithm also embodies a memory of past inputs and is able to determine whether the current input is consistent with those inputs. This comprises the consistency test 324. In particular, a least squares error function is evaluated and compared to a threshold. If the function is above threshold the current data are judged inconsistent and are discarded. Otherwise, it is determined consistent and is incorporated into the memory of the ranging algorithm. Concurrently, a new, generally more accurate, estimate of emitter location is made.

A more detailed description of system operation will be described, again in terms of the flow diagram FIG. 11. It will be appreciated by one skilled in the art that the parameters of the configuration are nominal and operation is similar for other configurations, for example, when the SBI's have more or fewer than five receiver channels as illustrated. The number of independent phase measurements available from an SBI is 1 less than the number of channels.

Raw phase measurements within each SBI 300 are phase linked 302 by techniques familiar to the state-of-the-art to restore total phase to the measurements. Phase linking resolves ambiguities, comprised of integral multiples of 360 degrees, which may be present in the raw measurements. These arise because the electronic phase detection circuitry is able to resolve phase only modulo 360 degrees. The restored measurements are input to Estimate Angle of Incident Wave 304. The estimation is made by a least squares procedure.

Figure 12:
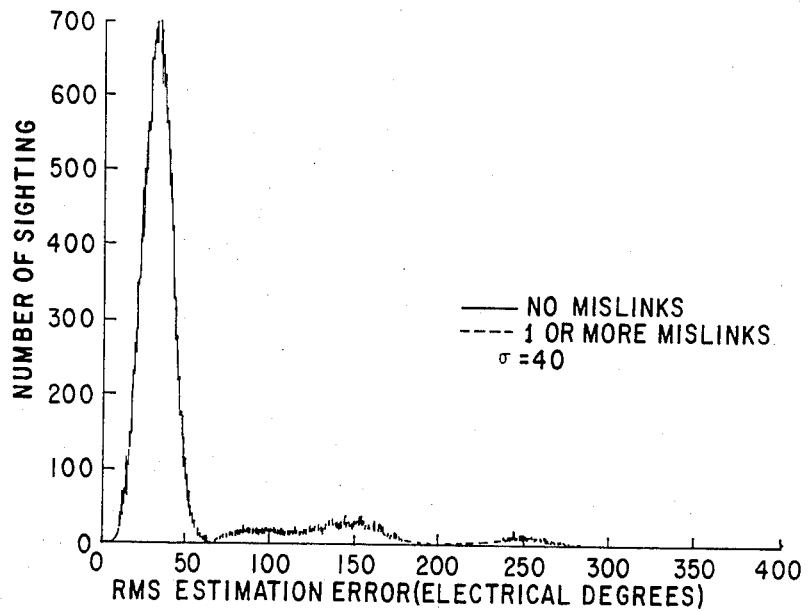
FIG. 12 is a chart of the probabilities of correctly linking and mislinking electrical phase within the SBIs.

Specifically, the error function $J_1$ of equation 1 of the Equation Table is minimized with respect to the angle of the incident wave (theta). An equation implicitly defining the minimizing value of theta may be obtained by differentiating $J_1$ with respect to theta and setting the result to zero. This equation may be solved for theta using a recursive algorithm, such as Newton's method. When the result is substituted into equation 1 the minimum value of the error function is obtained. This number is indicative of errors present in the output from 302 and therefore, may be used to detect phase linking errors within 302. Such errors are rare due to conservative spacing of antenna elements within the SBI arrays but may occur under conditions of multipath distortion or signal masking. The ability of the minimum value of the error function to detect phase linking errors is shown in FIG. 12. The figure applies when electrical phase is measured within a standard deviation of 40. (This and subsequent models of the phase measurement circuitry assume measurement error is normally distributed with zero mean and with the stated standard deviation.) The figure contains a solid curve depicting the situation where there are no phase linking errors and a dashed curve depicting the situation where one or more phase linking errors are present. As the curves overlap to negligible extent, a threshold can be selected to reject estimates containing phase linking errors while passing most estimates free of phase linking errors. For example, a threshold of 50 would be suitable for the conditions of FIG. 12.

Figure 13:
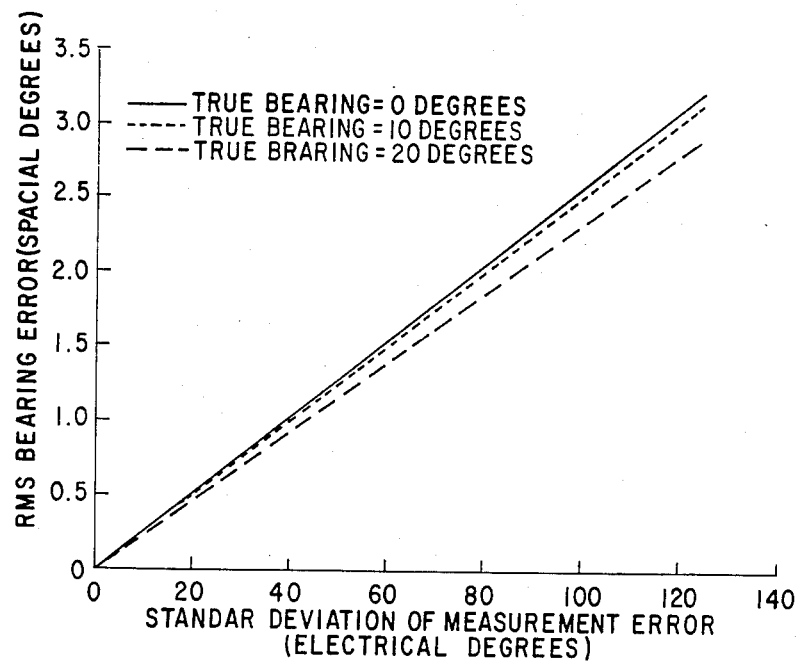
FIG. 13 is a plot of the RMS error in estimating bearing to emitter from combined outputs of the SBIs.

Derivation of the test parameter (the minimum value of $J_1$) and comparison to a threshold comprise the consistency test 306. If the test is passed, the associated estimate is passed to Phase Link 310 of level 2. Otherwise, the estimate is discarded. The residual errors in the estimates passed to 310 are shown in FIG. 13 for various standard deviations and several angles of incidence.

The LBI measurement 306 is measured between selected receivers in each SBI. This measurement is input with the estimate from 306 to Phase Link 310. These inputs are time-coincident. That is, they are derived from simultaneous phase measurements. Phase linking is accomplished by using theta to predict the total phase between the receivers of the LBI. This prediction is approximate because the existing error in theta is amplified by the gain of the LBI. This approximation is then corrected by the actual LBI measurement to provide a precise phase linked LBI phase measurement.

Figure 14:
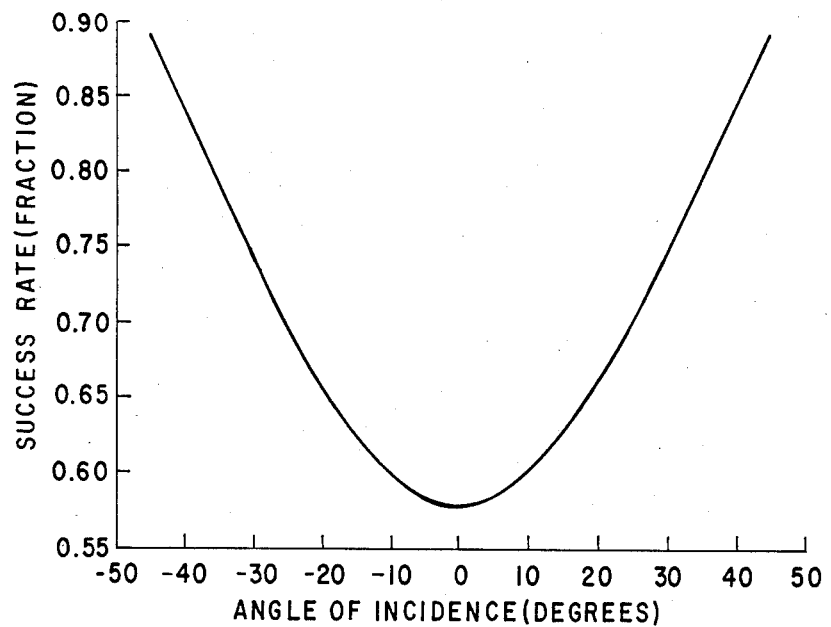
FIG. 14 is a chart of the success rate of phase linking of the LBI as function of angle of incidence.

The correction is based on the principle that the least change should be made to the approximate value consistent with the property that, when aliased modulo 360 degrees, the corrected value yields the measurement 306. These operation are represented by equations 2 through 4. In 2 an ambiguity index, eta, is determined. This is used in 4 to determine the phase linked LBI measurement which is the output from 310. Owing to the considerable distance separating the receivers of the LBI, the success rate of phase linking is much lower than for the SBI's. For an assumed error model in which electrical phase is measured within a standard deviation of 10. FIG. 14 shows the fraction of the phase, linking attempts that will be successful on the average. This result depends on the angle of the incident wave. Because the probability of a phase linking error is substantial, additional steps are taken to detect and correct such errors where they occur. These operation are performed in 312, 314 and 316. The basis for these operations is the temporal characteristics of phase. Therefore, processing utilizes outputs from 310 collected over an interval of time and buffered for subsequent processing.

For short intervals of time, the phase difference between the LBI receivers, which varies continuously with time, can be represented by a linear model. That is, the phase versus time relationship is closely approximated by a straight line. The mathematical representation of the temporal phase model is set forth in equation 5. The Construct Temporal Phase Model 312 determines the model parameters g and a in equation 5 by least squares. That is, the parameters are picked to minimize the average squared differences between the model and measurements. This criterion is embodied in the error function $J_2$ of equation 6.

An example, illustrating the relation of the temporal phase model to the data from 310 is given in FIG. 15. The model is represented by the line and the data, by small circles. Mislinked phase estimates are distinguished as black circles. The minimum value of $J_2$, hereafter referred to as the mean squared error (MSE), is a measure of the scatter of the points about the line and is indicative of phase linking errors. In FIG. 15 the MSE=110, 162 indicates the presence of multiple phase linking errors. Comparison of the MSE to a threshold comprises the Consistency Test 314. IF the MSE is above threshold, the data are determined inconsistent and are sent to Relink 316 for correction. Otherwise, the data is forwarded to level 3 for processing by the Ranging Algorithm.

In Relink 316 the locations of measurements relative to the temporal phase model is evaluated. If a correction, consisting of an integral multiple of 360 degrees added to a measurement places it closer to the model, that correction is made. This, in effect, relinks the measurement. When all measurements in the ensemble have been considered the ensemble is returned to 312 for further processing. The result is shown in FIG. 16. The temporal phase model, as well as many of the measurements have been altered by the effects of Relink 316. However, the value MSE=8767 indicates residual phase linking errors remain (as substantiated by the black circles in FIG. 16). Therefore, the Consistency Test 314 is failed and the ensemble is sent to 316 for relinking. The operations in relink are as previously described. The relinked data is returned to 312. The resulting temporal phase model and data are depicted in FIG. 17. The small MSE=71 indicates that all phase linking errors have been corrected and so that Consistency Test 314 is passed. The ensemble of corrected measurements is then passed to Estimate Bearings 318. If the consistency test is not passed after three tries, the measurements are discarded and operation suspended pending arrival of a new ensemble of data from 310.

Figure 18:
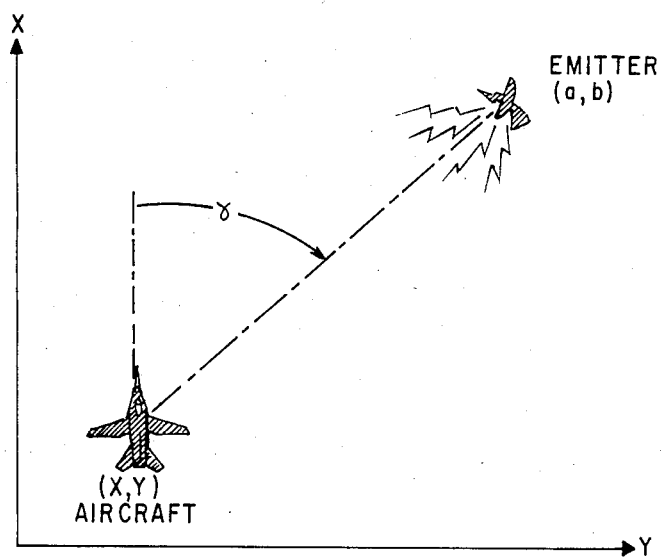
FIG. 18 is a chart of two-dimensional tracking geometry.

Estimate Bearings 318 solves for the angle of the incident wave by inverting the interferometer equation as in equation 7. Bearing estimates from 318 with coincident measurements of position and heading from the Inertial Navigational system 320 are input to the ranging algorithm, identified as Least Squares (Moore-Penrose) 332. For reference, the applicable geometry is given in FIG. 18. For simplicity, 2-dimensional geometry has been illustrated. However, the principles are readily extensible to 3-dimensional geometry. The heading from the inertial navigational system 320 allows the angle of the incident wave from 318 to be referenced to a fixed (x-y) coordinate system and, in particular, to the x-axis in FIG. 18. This becomes the bearing to the emitter and is denoted by the symbol gamma. The coordinates of the aircraft, also known from 320, are denoted (x,y). The unknown coordinates of the emitter are denoted (a,b). The ranging algorithm 32 determines (a,b) from a sequence of measurements of gamma and (x,y) along the flight path. The basis for this determination is equation 8 which holds for all measurements of the sequence—a fact expressed by the system of equations 9. Equation 9 may be solved for the emitter coordinates by least squares. Discussion is facilitated by introducing the more compact notation of equation 10, which is a symbolic representation of 9.

The least squares estimate of emitter location is determined by finding the vector e which minimizes the error function $J_3$ in equation 11. This is readily accomplished by methods known to those skilled in the art. The method amounts to solving the matrix-vector equation 12, which is not difficult because the symmetric matrix denoted Q is of dimension 2×2 and the vector denoted g is of dimension 2×1. One consequence is that a vast amount of measurement date, implicit in equation 9 is represented by a few numbers in 12. It is important that faulty measurements not be allowed to corrupt these numbers.

To guard against such an event a Consistency Test 324 is applied to each new block of data from 318 and 320. If processed independently, the new data would yield and equation structurally identical to 12 but with different parameters as indicated by equation 13. Solution of 13 yields an estimate of emitter location which minimizes the least squares error function defined in equation 14.

The magnitude of $J_4$ is an indication of data consistency and the Consistency Test 324 is based on the value of $J_4$ computed from 14. For this purpose, the value of e is taken as the least squares solution for all measurements, rather just those upon which 14 is based. This solution is obtained by solving equation 15. As before, the test is failed if the error function is above threshold and is passed, otherwise. If the Consistency Test 324 is passed, the new data is assimilated permanently and the composite solution previously obtained by solving 15 is adopted as the current estimate of emitter location. If the test is failed, the new data is discarded and the previous solution is retained as the current estimate.

POWER SUPPLY

The emitter control system power system (FIG. 3) must be that required to provide the necessary power to drive the subsystems. This requires power supplied for 5 Vdc and ±15 Vdc. The power supply delivers to each subsystem a voltage that is 2 or 3 volts higher than required to eliminate the problems associated with voltage drop in long cabling runs. Local regulators are used in each subsystem to regulate the input power at the required voltages.

CONTROL PANEL

Figure 19:
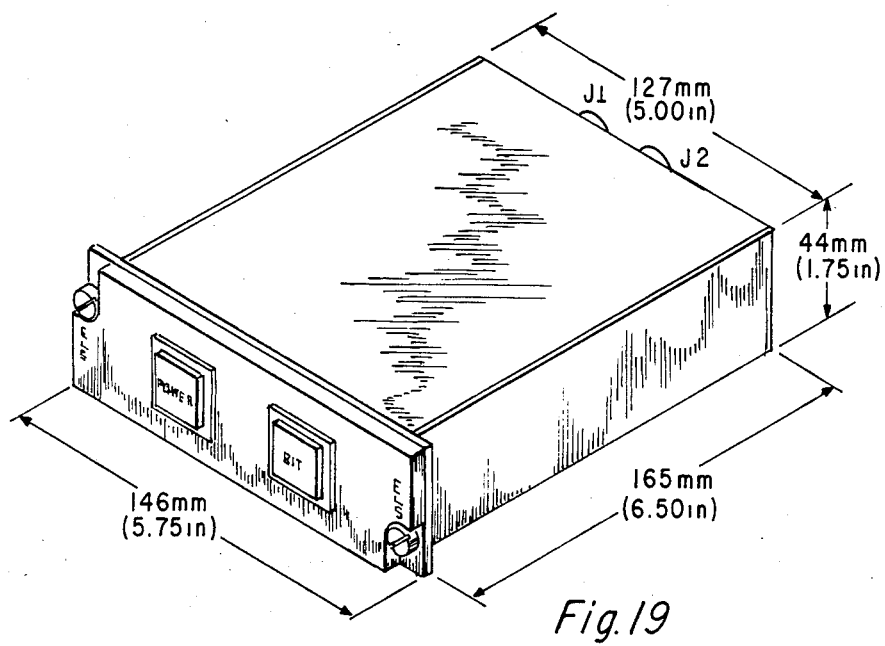
FIG. 19 is an isometric view of the ELS control panel.

A control panel (FIG. 19) allows direct operator control of key system functions. It consists of two backlighted pushbutton switches 250 and 252. A power switch 252 is a latched switch that, when selected, completes the circuit to energize a +28 Vdc relay in the ELS power supply. The energized relay allows transfer of aircraft three phase power to the power supply. The top portion of the power switch is lit when 28 Vdc is applied to the aircraft. When the emitter locator system power switch is engaged, the bottom portion of the switch is illuminated green indicating power is applied to the ELS. At the same time, the top portion of the built in test (BIT) switch 252 is illuminated to display that switch function and location. A GO portion of the BIT switch is illuminated green as long as the system is powered and no faults are detected. The processor extinguishes the GO and illuminated the NO GO in red to indicate a detected emitter locator system failure.

EQUATION TABLE

1. $J_1 = \sum_{i=1}^{4} \{[\delta\phi_i^L - g_i\sin(60 - \theta)]^2 + [\delta\phi_i^R - g_i\sin(60 + \theta)]^2\}$ Where:
(a) $\delta\phi_i^L$ = ith phase measurement, left SBI
(b) $\delta\phi_i^R$ = ith phase measurement, right SBI
(c) $g_i$ = 360 d/λ = array gain associated with ith phase measurement
(d) $d_i$ = spacing of receiver antennas associated with ith phase measurement
(e) λ = wavelength of wave in free space
(f) 60 − θ = angle of incident wave relative to

EQUATION TABLE-continued (g) $60 + \theta$ = boresight of left SBI
angle of incident wave relative to boresight of right SBI.

2. $n = \left[\dfrac{\hat{\tilde{\Delta}} - \hat{\Delta}}{360}\right]_{NI}$

Where:
(a) $\hat{\Delta}$ = phase difference estimated from level 1 data as specified in Equation 3
(b) $\hat{\tilde{\Delta}}$ = phase difference measured between receivers of the LBI
(c) $[\ldots]_{NI}$ implies the quantity $(\ldots)$ rounded to the nearest integer.

3. $\hat{\Delta} = G \sin\hat{\theta}$

Where:
(a) G = gain of the LBI defined as in Equation 1(c) but with spacing equal to the separation of the LBI receivers
(b) $\theta$ = estimated angle of the incident wave from level 1.

4. $\tilde{\Delta} = \bar{\tilde{\Delta}} + n360$

Where:
(a) $\tilde{\Delta}$ = phase linked LBI measurement
(b) $\bar{\tilde{\Delta}}$ = as defined in Equation 2(b)
(c) n = as defined in Equation 2.

5. $\Delta_i^m = g + a(i\Delta t)$

Where:
(a) $\Delta_i^m$ = phase predicted by the model for the sample corresponding to the time index i
(b) g = phase predicted by the model for i = 0
(c) a = the slope of the straight line (model)
(d) i = time index
(e) $\Delta t$ = time interval between successive samples.

6. $J_2 = \dfrac{1}{N} \sum\limits_{i=0}^{N-1} (g + ia\Delta t - \tilde{\Delta}_i)^2$ Where:
(a) g, i, a and $\Delta t$ are defined in Equation 5
(b) $\tilde{\Delta}_i$ is the measurement coincident with time index i.

7. $\theta_i = \sin^{-1} \dfrac{\tilde{\Delta}_i}{G}$

Where:
(a) $\tilde{\Delta}_i$ = as defined in Equation 6(b)
(b) $G = 360 D/\lambda$ = gain of LBI
(c) D = distance between antennas of the LBI
(d) $\lambda$ = wavelength of wave in free space 8. $a - b \tan\gamma = x - y \tan\gamma$ Where:
(a) a = x-coordinate of emitter location*
(b) b = y-coordinate of emitter location*
(c) $\gamma$ = bearing to emitter referenced to the x-axis*
(d) (x, y) = ownership coordinates*
  *See FIG. 18

9. $\begin{bmatrix} 1 - \tan\gamma_1 \\ 1 - \tan\gamma_2 \\ \vdots \\ 1 - \tan\gamma_k \end{bmatrix} \begin{pmatrix} a \\ b \end{pmatrix} = \begin{bmatrix} x_1 - y_1\tan\gamma_1 \\ x_2 - y_2\tan\gamma_2 \\ \vdots \\ x_k - y_k\tan\gamma_k \end{bmatrix}$ Where:
All quantities are as defined in Equation 8.
Subscripts denote times at which measurements are taken.

10. $A_1 \underline{e} = \underline{f}_1$

EQUATION TABLE-continued

Where:
(a) $A_1$ = matrix on left of Equation 9
(b) $\underline{e} = (a\ b)^T$
(c) $\underline{f}_1$ = vector on right of Equation 9.

11. $J_3 = ||A_1\underline{e} - \underline{f}_1||^2$

Where:
(a) $||\ldots||$ denotes Euclidian norm of $(\ldots)$
(b) All other quantities are as defined in Equation 10.

12. $Q_1\underline{e} = \underline{g}_1$

Where:
(a) $Q_1 = A_1^T A_1$
(b) $\underline{g}_1 = A_1^T \underline{f}_1$
(c) All other quantities are as defined in Equation 11

13. $Q_2\underline{e} = \underline{g}_2$

Where:
All quantities are as defined in Equation 12 but for measurements in the time interval defined by indices $i = k + 1, k + 2, \ldots, n$.

14. $J_4 = ||A_2\underline{e} - \underline{f}_2||^2$

Where:
All quantities are as defined for Equation 11 but for measurements in the time interval defined by indices $i = k + 1, k + 2, \ldots n$.

15. $(Q_1 + Q_2)\underline{e} = \underline{g}_1 + \underline{g}_2$

Where:
All quantities are as defined in Equations 12 and 13.

OPERATION

In operation the two short baseline interferometers provide phase angle measurements for estimating incident angle of incoming electromagnetic energy from an emitter. The long baseline interferometer provides phase angle measurements for improving the estimates of the incident angles of incoming electromagnetic energy. These phase angle measurements are processed in a computing means including first, second and third level processing means. The first level processing means providing an estimate of the angle of incident electromagnetic energy from the SBIs. The second level processing means receives the estimated angle of incidence from level 1 and the aliased LBI phase measurement to provide a corrected estimate of the angle of incident wave which is used as the bearing to the emitter. The third level processing means receives the bearing estimates and with heading and position information of the carrier and determines the location of the emitter.

Although only a single embodiment of the invention has been disclosed, it will be apparent to a person skilled in the art that various modifications to the details of construction shown and described may be made without departing from the scope of this invention.

I claim:

1. An apparatus for locating emitters of electromagnetic energy comprising:
   a. first and second interferometers having preselected baselines for providing phase measurements for estimating incident angle of incoming electromagnetic energy from an emitter;
   b. linking means interconnecting the first and second interferometers forming a third interferometer for improving the estimates of the incident angles of incoming electromagnetic energy to provide an aliased phase measurement thereby;

c. means for providing carrier position and heading information of the apparatus; and d. computing means responsive to the phase measurements from the interferometers for providing estimation of the angle of incidence, for improving the estimate of the angle of incidence and for determining the bearing to the electromagnetic energy emitter and the computing means includes; a level one data processing means operatively connected to the first and second interferometers for phase linking the phase measurements of the first and second interferometers to restore the total phase, means responsive to the total phase for estimating the angle of the incident wave, the incoming electromagnetic energy, and test means responsive to the angle of incident wave and a threshold for determining whether phase linking errors have occurred in the estimated angle and selectively passing the estimated angle to a level two data processing means for improving the estimation of the angle of the incident wave and selectively passing the improved estimated angle of the incident wave to a level three data processing means for combination with provided carrier position and heading information for determining the bearing and location of the electromagnetic energy emitter.

2. The apparatus according to claim 1 wherein the first and second interferometers for determining the phase of incoming electromagnetic energy each includes a plurality of superheterodyne receivers having antennas in a predetermined spaced relationship one to another for downconverting the incoming electromagnetic energy to an intermediate frequency if, a phase detector responsive to the IF for determining the electrical phase of the incoming electromagnetic energy; and an analog to digital converter for converting the electrical phase into digital signals for the computing means.

3. The apparatus according to claim 1 wherein the level two data processing means for improving the estimated angle of the incident wave comprises means for simultaneously combining the phase measurements of level one with the aliased phase measurement of the third interferometer and selectively adding to the aliased phase measurement an integral of 360 degrees in such proportion as to restore the aliased phase measurement to total phase and determining the presence of any phase linking errors, and test means responsive to the improved estimated angle of incident wave and a threshold and selectively passing the improved estimated angle of incident wave to the level three data processing means for estimating the bearing to the emitter.

4. The apparatus according to claim 3 wherein the level three data processing means comprises a bearing and ranging means for relating the estimated bearings to a fixed coordinate system and determining the location of the electromagnetic energy emitter, and a test means for comparing previous bearing estimates to the present bearing estimate and selectively outputting the bearing and emitter location information.

5. The apparatus according to claim 3 wherein the bearing and ranging means includes means responsive to the estimated bearing and carrier position and heading information for determining the location of the emitter by the least squares method.

6. An apparatus for determining the direction and range to an electromagnetic energy emitter comprising:

(a) first and second baseline interferometers including a plurality of electromagnetic energy receivers for producing a plurality of phase measurements from incoming electromagnetic energy emanating from an emitter;

(b) a third baseline interferometer operatively connected to selected receivers of the first and second baseline interferometers for producing an aliased phase measurement; and (c) a computing means including first, second and third level processing means, the first level processing means operatively connected to the first and second baseline interferometers for restoring the total phase of the plurality of phase measurements received from the first and second baseline interferometers, estimating the angle of incidence from the total phase and performing a consistency test for determining whether phase linking errors have occurred and selectively passing the estimated incident angle to the second level processing means; the second level processing means operatively connected to the first level processing means and third baseline interferometer for receiving, respectively, the incident angle estimate and aliased phase measurement and adding to the aliased measurement and integral multiple of 360 degrees for total phase restoration, storing a sequence of restored total phase measurements, constructing a temporal phase model from the sequence of restored total phase measurements and determining therefrom any phase linking errors, determining proper phase linking and passing data representing an improved incident angle, bearing estimate means responsive to the improved incident angle data for producing and passing a bearing estimate to the level three processing means; the level three processing means operatively connected to the bearing estimate means for receiving the bearing estimates and responsive to carrier position and heading information relating the measured bearings to a fixed coordinate system, and determining the location of the emitter.

* * * * *